United States Patent
Gubeskys et al.

(10) Patent No.: US 9,814,088 B2
(45) Date of Patent: *Nov. 7, 2017

(54) TECHNIQUES FOR ASSISTING RADIO ACCESS TECHNOLOGY (RAT) COMMUNICATIONS USING ANOTHER RAT

(71) Applicant: QUALCOMM Incorporated, San Diego, CA (US)

(72) Inventors: Arthur Gubeskys, Hod Hasharon (IL); Assaf Touboul, Netanya (IL); Oz Barak, Hod Hasharon (IL); Raphael Cohen, Raanana (IL)

(73) Assignee: QUALCOMM Incorporated, San Diego, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 14/859,133

(22) Filed: Sep. 18, 2015

(65) Prior Publication Data

US 2016/0295631 A1   Oct. 6, 2016

Related U.S. Application Data

(60) Provisional application No. 62/142,264, filed on Apr. 2, 2015.

(51) Int. Cl.
- *H04W 76/02* (2009.01)
- *H04W 56/00* (2009.01)
- *H04B 7/0456* (2017.01)

(52) U.S. Cl.
CPC ........ *H04W 76/026* (2013.01); *H04B 7/0456* (2013.01); *H04W 56/0005* (2013.01); *H04W 76/025* (2013.01)

(58) Field of Classification Search
CPC .............. H04B 7/0456; H04W 76/025; H04W 76/026; H04W 56/0005
See application file for complete search history.

(56) References Cited

U.S. PATENT DOCUMENTS 8,254,355 B2   8/2012   Park
8,412,195 B2   4/2013   Yuk et al.
(Continued)

FOREIGN PATENT DOCUMENTS

WO   WO-2014090344 A1   6/2014
WO   WO-2014110803 A1   7/2014
WO   WO-2014110981 A1   7/2014

OTHER PUBLICATIONS

International Search Report and Written Opinion—PCT/US2016/023539—ISA/EPO—dated Jun. 28, 2016. 12 Total Pages.
(Continued)

*Primary Examiner* — Jianye Wu
(74) *Attorney, Agent, or Firm* — Arent Fox, LLP

(57) ABSTRACT

Systems and methods for communicating in a wireless network using a first radio access technology (RAT) and an assisting RAT are disclosed. A first connection can be established with a user equipment (UE) using the first RAT, and a second connection can be established with the UE using an assisting RAT. A timing of the first connection can be synchronized based at least in part on a timeline of the assisting RAT, and a neighboring access point can be collaborated with in communicating with a UE over at least the first connection.

20 Claims, 17 Drawing Sheets

(56) References Cited

U.S. PATENT DOCUMENTS

| | | | |
|---|---|---|---|
| 8,711,820 | B2 | 4/2014 | Grandhi |
| 8,879,416 | B2 | 11/2014 | Mishra et al. |
| 9,331,883 | B1 * | 5/2016 | Schelstraete ........ H04L 27/2626 |
| 2002/0167898 | A1 | 11/2002 | Thang et al. |
| 2006/0145775 | A1 | 7/2006 | Zhang et al. |
| 2011/0164699 | A1 * | 7/2011 | Ojard .................... H04B 7/0452 |
| | | | 375/267 |
| 2012/0140743 | A1 | 6/2012 | Pelletier et al. |
| 2012/0163287 | A1 | 6/2012 | Raaf et al. |
| 2013/0028117 | A1 | 1/2013 | Montojo et al. |
| 2013/0077514 | A1 | 3/2013 | Dinan |
| 2013/0095821 | A1 | 4/2013 | Lim et al. |
| 2013/0107912 | A1 | 5/2013 | Ponnampalam |
| 2013/0114577 | A1 * | 5/2013 | Cai ....................... H04L 5/0053 |
| | | | 370/336 |
| 2013/0272260 | A1 * | 10/2013 | Bitran ................... H04W 16/14 |
| | | | 370/329 |
| 2013/0329583 | A1 | 12/2013 | Vrzic et al. |
| 2013/0343236 | A1 | 12/2013 | Chen et al. |
| 2014/0073288 | A1 | 3/2014 | Velasco |
| 2014/0093005 | A1 | 4/2014 | Xia et al. |
| 2014/0185494 | A1 | 7/2014 | Yang et al. |
| 2014/0192734 | A1 | 7/2014 | Ng et al. |
| 2014/0269562 | A1 | 9/2014 | Burchill et al. |
| 2014/0293874 | A1 | 10/2014 | Oh et al. |
| 2014/0328271 | A1 | 11/2014 | Chen et al. |
| 2014/0364133 | A1 | 12/2014 | Chae et al. |
| 2015/0365790 | A1 | 12/2015 | Edge et al. |
| 2016/0100400 | A1 | 4/2016 | Lu et al. |
| 2016/0295629 | A1 | 10/2016 | Gubeskys et al. |
| 2016/0295630 | A1 | 10/2016 | Gubeskys et al. |

OTHER PUBLICATIONS

International Search Report and Written Opinion—PCT/US2016/023535—ISA/EPO—dated Jun. 28, 2016. 12 Total Pages.
International Search Report and Written Opinion—PCT/US2016/023528—ISA/EPO—dated Jul. 5, 2016. 12 Total Pages.

* cited by examiner

TECHNIQUES FOR ASSISTING RADIO ACCESS TECHNOLOGY (RAT) COMMUNICATIONS USING ANOTHER RAT

CLAIM OF PRIORITY UNDER 35 U.S.C. §119

The present application for patent claims priority to Provisional Application No. 62/142,264 entitled "TECHNIQUES FOR ASSISTING RADIO ACCESS TECHNOLOGY (RAT) COMMUNICATIONS USING ANOTHER RAT" filed Apr. 2, 2015, which is assigned to the assignee hereof and hereby expressly incorporated by reference herein.

INTRODUCTION

Aspects of this disclosure relate generally to telecommunications, and more particularly to performing wireless communications using a plurality of radio access technologies (RATs).

A wireless communication network may be deployed to provide various types of services (e.g., voice, data, multimedia services, etc.) to user equipment (UE) within a coverage area of the network. In some implementations, one or more access points (e.g., corresponding to different cells) provide wireless connectivity for access terminals (e.g., cell phones) that are operating within the coverage of the access point(s). In some implementations, peer devices provide wireless connectivity for communicating with one another.

Various RATs may be provided to facilitate wireless communications between UEs and access points, such as cellular technologies including third generation partnership project (3GPP) long term evolution (LTE), or other Universal Mobile Telecommunication System (UMTS) technologies, local area network (LAN) technologies including Institute of Electrical and Electronics Engineers (IEEE) 802.11 (e.g., Wi-Fi), etc. Thus, some RATs may operate in a cellular or licensed spectrum/frequency bands (e.g., LTE) while other RATs operate in unlicensed or shared spectrum/frequency bands (e.g., Wi-Fi). A licensed or cellular spectrum may refer to wireless spectrum utilized by wireless network operators under administrative license from a governing agency. An unlicensed or shared spectrum may refer to industrial, scientific and medical (ISM) radio bands and/or to a spectrum used in a contention-based communications systems. In some examples, unlicensed spectrum is the U-NII radio band, which may also be referred to as the 5 GHz or 5G band.

Potentially every RAT has positive attributes that makes the RAT attractive for certain scenarios. For example, RATs for wireless wide area networks (WWANs), such as LTE, are inherently reliable due to properties defined therefor, such as synchronized communications, hybrid automatic repeat/request (HARQ) operations, cyclic redundancy check (CRC), etc. These functions, however, may require additional processing/power consumption and additional bandwidth, which may be costly in the licensed spectrum. RATs for wireless LANs (WLANs), such as Wi-Fi, provide a robust but noisy and relatively cheap bandwidth over which to communicate, but do not provide the checks and assurances of other RATs that increase reliability of the communications, such as LTE.

In addition, many UEs are currently equipped with technology to facilitate communicating using a cellular technology (e.g., LTE) and a LAN technology (e.g., Wi-Fi). Thus, some existing technologies seek to aggregate LTE and Wi-Fi connections to separate access points where the access points can communicate over a backhaul link to organize the communications. Such technologies, however, typically utilize Wi-Fi as an offload for data requested via the LTE network. In addition, some existing technologies attempt to utilize the unlicensed frequency band (e.g., the Wi-Fi band) to communicate using the LTE RAT. This can free some usage of the licensed frequency band for LTE and can be used in residential or smaller deployments; however, the higher processing/power consumptions associated with LTE remain in such configurations.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. Systems and methods for using one or more radio access technologies (RATs) to assist communications in one or more other RATs are disclosed.

In accordance with an aspect, a method for communicating in a wireless network using a first RAT and an assisting RAT is provided. The method includes establishing a first connection with a user equipment (UE) using the first RAT, establishing a second connection with the UE using an assisting RAT, synchronizing a timing of the first connection based at least in part on a timeline of the assisting RAT, and collaborating with a neighboring access point in communicating with a UE over at least the first connection.

In another example, an apparatus for communicating in a wireless network using a first RAT and an assisting RAT is provided. The apparatus includes a first RAT radio configured to establish a first connection with a UE using the first RAT, an assisting RAT radio configured to establish a second connection with the UE using an assisting RAT. The apparatus further includes a memory component, and at least one processor coupled to the memory component, the at least one processor and the memory component configured to synchronize a timing of the first connection based at least in part on a timeline of the assisting RAT, and collaborate with a neighboring access point in communicating with a UE over at least the first connection.

In yet another example, a computer-readable storage medium comprising computer-executable code for communicating in a wireless network using a first RAT and an assisting RAT is provided. The code includes code for establishing a first connection with a UE using the first RAT, code for establishing a second connection with the UE using an assisting RAT, code for synchronizing a timing of the first connection based at least in part on a timeline of the assisting RAT, and code for collaborating with a neighboring access point in communicating with a UE over at least the first connection.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
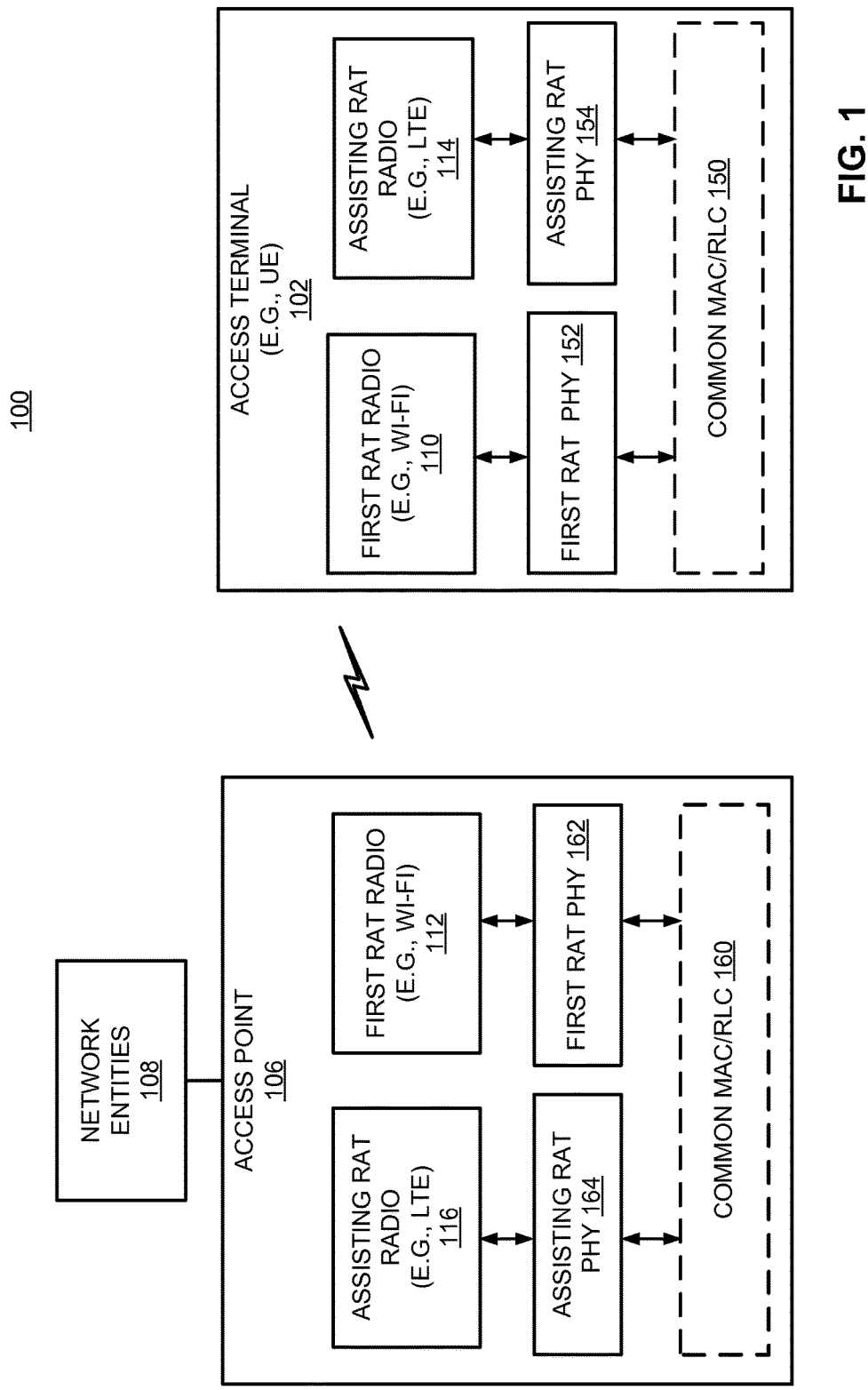
FIG. 1 is a simplified block diagram of several sample aspects of a communication system employing a first radio access technology (RAT) and an assisting RAT.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The disclosure relates in some aspects to utilizing at least one radio access technology (RAT), which is referred to herein as an assisting RAT, to assist communications in at least one other RAT at least at a physical layer. This can facilitate leveraging certain properties of the assisting RAT (e.g., physical layer properties) in communicating using the other RAT. In this regard, a common media access control (MAC) layer, and/or higher layers, can be provided for communications using the assisting RAT and other RAT at the physical layer. In addition, for example, where the assisting RAT relates to a synchronized timeline for communications, the other RAT can be synchronized based on the timeline as well to facilitate leveraging some of the physical layer properties of the assisting RAT. For example, the timeline of the assisting RAT can relate to divisions of time over which communications are scheduled, such as a subframe, a frame, a transmission time interval (TTI), etc. Accordingly, for example, aligning the first RAT with the assisting RAT timeline can include aligning beginning of transmission of signals in the first RAT with the beginning of a division of time (e.g., subframe, frame, TTI, etc.) of the assisting RAT. Thus, a node receiving communications over a first physical layer connection at the first RAT can expect the communications to begin at the division of time related to the assisting RAT. Where the assisting RAT facilitates synchronous communications, the first RAT can be synchronized as well in this regard, which can result in many advantages described herein.

In a specific example, a cellular technology, such as third generation partnership project (3GPP) long term evolution (LTE), or other Universal Mobile Telecommunication System (UMTS) technology, can be utilized to assist communications in another cellular technology and/or a local area network (LAN) technology, such as Institute of Electrical and Electronics Engineers (IEEE) 802.11 (e.g., Wi-Fi). For example, LTE can provide reliable communications based on certain properties thereof, such as synchronized communications, hybrid automatic repeat/request (HARQ) operations, cyclic redundancy checks (CRC), etc. Accordingly, these properties may be leveraged at the physical layer (e.g., over an LTE communications link) to support communications using other RATs at the physical layer (e.g., over another communications link). For example, the asynchronous nature of some RATs (e.g., Wi-Fi) makes them prone to interference in general, and more specifically to collisions where more than one node transmit simultaneously. Carrier sense multiple access (CSMA) and collision avoidance (CA) have been implemented for Wi-Fi, for example, but may be of limited effect in some cases. For example, in a highly crowded frequency spectrum (e.g., an unlicensed band), the interference level may be quite high, and a lot of air time can be wasted on waiting for the uninterrupted transmission opportunity to gain access to the communications medium. The transmit (TX) time backoff specified in CSMA may also reduce MAC efficiency and total data throughput as wireless devices further delay attempts to access the communications medium with each failed attempt. Moreover, Wi-Fi is subject to the problem of a "hidden node," which leads to high collision probability in some deployment scenarios. For example, a hidden node may refer to a node whose transmissions are detectable by a receiving node, but not by another node transmitting to the receiving node. Thus, transmissions from the transmitting node may interfere with communications from/to the hidden node. Techniques to mitigate the hidden node issue exist (e.g., request to send (RTS)/clear to send (CTS)), but can further lower the MAC efficiency.

Moreover, the coverage (or range) of a Wi-Fi access point is small compared to the alternative cellular technologies at the same or similar TX power. This is partially due to the known issue with the legacy signal (L-SIG) preamble field (and also very high throughput signal (VHT-SIG) to some extent) being coded with modulation and coding scheme (MCS) 0 convolutional code (CC) and having no proper CRC indication. Another reason for the smaller coverage area is the lack of HARQ, which improves cell edge reception in cellular communications. Accordingly, as described further herein, such properties of LTE can be leveraged for Wi-Fi by additionally utilizing an LTE link (or other cellular or wireless wide area network (WWAN) technology) at the physical layer. For example, the licensed LTE does not suffer from interference as much as Wi-Fi, offers better coverage, etc., but can cost more per bandwidth. Hence, in accordance with aspects described herein, a low bandwidth LTE carrier can be used to handle some control procedures of Wi-Fi, such as billing, authentication, etc., as well as the functions that affect the coverage/range of Wi-Fi on the unlicensed band, such as HARQ, CRC, etc. The data transmissions, however, can be performed over the Wi-Fi link, which can have a better cost structure for high data rate communications. Selectively utilizing an LTE link in this regard can allow for providing additional functions for the Wi-Fi link that are not typically achievable, such as scheduled communications, increased coverage area, improved reliability of HARQ feedback, access point collaboration functions (e.g., beamforming, related channel sounding, etc.), and/or the like. Certain aspects of utilizing properties of LTE, or other cellular or WWAN technologies, to leverage Wi-Fi may be referred to as license-assisted access or LAA.

Additionally, synchronizing the timeline of the first RAT with the assisting RAT in this regard allows for collaboration among access points of the first RAT based on having the synchronized timing. For example, the access points of the first RAT can perform collaborative beamforming in communicating with access terminals based on the synchronized timing. Further, for example, an access point can detect packets from access terminals based not only on in-phase (I)/quadrature (Q) samples obtained in signals from the UEs, but also on I/Q samples of other signals received from the access terminals by other synchronized access points (e.g., in a similar period of time).

Previous configurations have been developed for a user equipment (UE) communicating with multiple cells using different RATs to send control data for a second RAT over uplink resources of the first RAT. In these configurations, the timing for sending the control data for the second RAT can be substantially conformed to the timing of transmitting using the first RAT to facilitate communicating the control data using the first RAT. This is different from the aspects described herein for multiple reasons. For example, aspects described herein relate further to synchronizing the RAT for which control data is to be sent (the first RAT) with the RAT over which the control data is sent (the assisting RAT). Thus, there is no need to conform the timing of transmitting the control data using the assisting RAT as the first RAT is already synchronized to the assisting RAT. In addition, in these previous configurations, there is no common MAC layer supporting the physical layer connections at the first RAT connection and the second RAT connection.

In addition, other previous configurations can use LTE to transmit Wi-Fi assistance information to a UE, where the Wi-Fi assistance information is used by the UE to configure Wi-Fi. In these configurations, however, the Wi-Fi connection is not synchronized to the LTE connection. In addition, in these configurations, there is no common MAC layer supporting the physical layer connections at the Wi-Fi connection and the LTE connection. Other previous configurations describe using one network as a timing reference for another network, but do not synchronize a connection of one RAT using the timing of an assisting RAT, as described herein.

Aspects of the disclosure are provided in the following description and related drawings directed to specific disclosed aspects. Alternate aspects may be devised without departing from the scope of the disclosure. Additionally, well-known aspects of the disclosure may not be described in detail or may be omitted so as not to obscure more relevant details. Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

FIG. 1 illustrates several nodes of a sample communication (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, small cells, macro cells, femto cells, and so on, while access terminals may be referred to or implemented as user equipment (UEs), mobile stations, and so on.

Access points in the system 100 provide access to one or more services (e.g., network connectivity) for one or more wireless terminals (e.g., the access terminal 102) that may be installed within or that may roam throughout a coverage area of the system 100. For example, at various points in time the access terminal 102 may connect to the access point 106 or some other access point in the system 100 (not shown). One or more access points 106 may communicate with one or more network entities (represented, for convenience, by the network entities 108), including other access points, and/or backend network components (e.g., components for billing, authentication, or other subscription verification functions, etc.) to facilitate network connectivity. Two or more of such network entities may be co-located and/or two or more of such network entities may be distributed throughout a network.

A network entity may take various forms such as, for example, one or more radio and/or core network entities. Thus, in various implementations the network entities 108 may represent functionality such as at least one of: network management (e.g., via an operation, administration, management, and provisioning entity), call control, session management, mobility management, gateway functions, interworking functions, billing/authentication functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals.

Access terminal 102 may include a first RAT radio 110 for communicating with the access point 106 (and/or other access points or network nodes) using a first RAT. Similarly, access point 106 can include a first RAT radio 112 for communicating with the access terminal 102 (and/or other access terminals/UEs or network nodes) using the first RAT. In one example, the first RAT can be Wi-Fi, but it is to be appreciated that the first RAT can be substantially any RAT (e.g., another LAN RAT or cellular technology RAT) that may benefit from using aspects of an assisting RAT to augment physical layer communications between the access terminal 102 and access point 106 (e.g., over-the-air (OTA). In this regard, access terminal 102 may also include an assisting RAT radio 114 for additionally communicating with the access point 106 (and/or other access points or network nodes) using another RAT to assist the first RAT. Similarly, access point 106 can include an assisting RAT radio 116 for communicating with the access terminal 102 (and/or other UEs or network nodes) using another or different RAT to assist the first RAT. In an example, the assisting RAT corresponding to the assisting RAT radios 114 and 116 can be LTE, but it is to be appreciated that the assisting RAT can be substantially any RAT (e.g., a LAN RAT or other cellular technology RAT) that may have advantageous properties for augmenting the physical layer of the first RAT for communications between the access terminal 102 and access point 106.

In this regard, access terminal 102 may communicate with the access point 106 to access network entities 108 over the first RAT (via first RAT radio 110) and the assisting RAT (via assisting RAT radio 114) at the physical layer. As further illustrated in FIG. 1, access terminal 102 may optionally include a common MAC/radio link control (RLC) layer 150 (and/or higher layers) for the RATs to generate packets for communicating to access point 106 (and/or for receiving packets from the access point 106) over multiple physical layers (e.g., over the first RAT physical layer (PHY) 152 using first RAT radio 110 or over the assisting RAT PHY 154 using assisting RAT radio 114). Similarly, for example, access point 106 may optionally include a common MAC/RLC layer 160 for generating and transmitting packets to the access terminal 102 and/or receiving packets therefrom over multiple physical layers. The common MAC/RLC layer 160 supports the first RAT PHY 162 and the assisting RAT PHY 164, and can thus transmit MAC PDUs over either or both of the first RAT PHY 162 using first RAT radio 112 or the assisting RAT PHY 164 using assisting RAT radio 116. Thus, for example, physical layer aspects of the assisting RAT can be utilized to improve communications with the access point 106. For example, these aspects may include utilizing HARQ, CRC, etc. at the assisting RAT PHY 154 to augment communicating packets over the first RAT PHY 152. In another example, to facilitate leveraging these or other properties or aspects of the assisting RAT, access terminal 102 and/or access point 106 can synchronize communications for the first RAT PHY 152/162 based on a timeline relating to the assisting RAT PHY 154/164. In addition, in an example, certain services can utilize the assisting RAT PHY 154/164 exclusively (e.g., voice over internet protocol (VoIP)) to provide a certain quality of service (QoS) that may be more easily attained over the assisting RAT. In any case, in this regard, access point 106 can receive the communications from the access terminal 102 over the corresponding RAT physical layers, and can process the communications for providing to network entities 108 or other network nodes. It is to be appreciated that access point 106 can similarly generate communications for transmitting to the access terminal 102 over the first RAT (via first RAT radio 112 using the first RAT PHY 162) and/or the assisting RAT (via assisting RAT radio 116 using the assisting RAT PHY 164).

Referring to FIGS. 2-13, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 3, 5, 7, 10, and 12 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Figure 2:
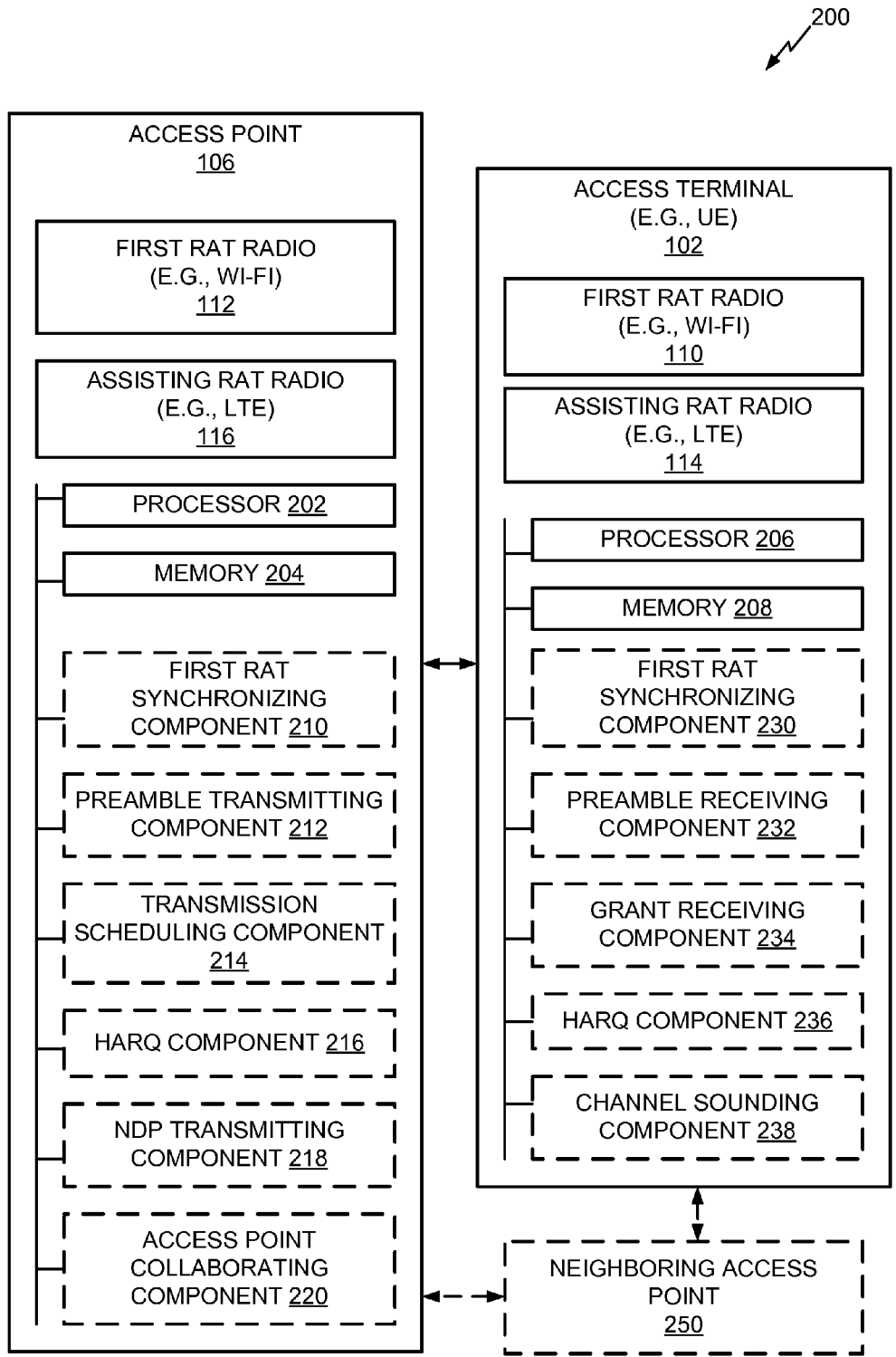
FIG. 2 illustrates a block diagram of an example system for employing a first RAT and an assisting RAT to perform wireless communications.

FIG. 2 illustrates an example system 200 for communicating using a RAT and an assisting RAT to improve communications using the RAT. System 200 includes an access terminal 102 (e.g., a UE) that communicates with an access point 106 using wireless communications. As described, access terminal 102 can include a first RAT radio 110 for communicating with the access point 106 using a first RAT, and access point 106 can include a first RAT radio 112 for communicating with the access terminal 102 using the first RAT. In addition, as described, access terminal 102 can include an assisting RAT radio 114 for communicating with the access point 106 using an assisting RAT, and access point 106 can include an assisting RAT radio 116 for communicating with the access terminal 102 using the assisting RAT. System 200 also optionally includes a neighboring access point 250 that may communicate with access point 106 (e.g., over a backhaul link) and/or access terminal 102 (e.g., over a first RAT radio and assisting RAT radio). It is to be appreciated that where neighboring access point 250 is present, the neighboring access point 250 may include similar components as access point 106, as described below, though these components are not shown in the neighboring access point 250 for ease of explanation.

Access point 106 can also include a processor 202 and memory 204, which may be coupled to one another via a bus or other medium, for implementing, executing, and/or storing instructions and/or parameters related to the various components described in connection with the access point 106. In another example, one or more of the various components may be implemented or executed by other processors (not shown). In an example, processor 202 can be at least a portion of processing system 1534 described in FIG. 15, one or more of the processors in FIG. 16 (e.g., Tx data processor 1614, processor 1630, Rx data processor 1642, etc.), and/or the like. In an example, memory 204 can be at least a portion of memory component 1540, as described in connection with FIG. 15, one or more memories described in FIG. 16 (e.g., data source 1612, memory 1632, etc.), and/or the like. For example, the various components can include a first RAT synchronizing component 210 for synchronizing communications using the first RAT over a first connection with an access terminal based at least in part on a timeline of the assisting RAT, a preamble transmitting component 212 for transmitting, using the assisting RAT over a second connection, a preamble related to the first RAT, a transmission scheduling component 214 for scheduling transmissions from an access terminal by communicating a scheduling request to the access terminal via the assisting RAT over the second connection, a HARQ component 216 for communicating, using the assisting RAT over the second connection, HARQ feedback for communications received using the first RAT over the first connection, a null data packet (NDP) transmitting component 218 for transmitting NDPs to one or more access terminals to facilitate channel sounding (e.g., used to perform beamforming to the one or more access terminals), and/or an access point collaborating component 220 configured to collaborate with other access points to perform one or more functions related to the first RAT based on synchronization of the first RAT.

Access terminal 102 can also include a processor 206 and memory 208, which may be coupled to one another via a bus or other medium, for implementing, executing, and/or storing instructions and/or parameters related to the various components described in connection with the access terminal 102. In another example, one or more of the various components may be implemented or executed by other processors (not shown). In an example, processor 206 can be at least a portion of processing system 1532 described in FIG. 15, one or more of the processors in FIG. 16 (e.g., Tx data processor 1638, processor 1670, Rx data processor 1660, etc.), and/or the like. In an example, memory 208 can be at least a portion of memory component 1538, as described in connection with FIG. 15, one or more memories described in FIG. 16 (e.g., data source 1636, memory 1672, etc.), and/or the like. For example, the various components may include a first RAT synchronizing component 230 for synchronizing communications using the first RAT over a first connection with an access point based at least in part on a timeline of the assisting RAT, a preamble receiving component 232 for receiving, using the assisting RAT over a second connection, a preamble related to the first RAT, a grant receiving component 234 for receiving and/or requesting a scheduling grant from the access point for communicating via the first RAT over the first connection, a HARQ component 236 for communicating, using the assisting RAT over the second connection, HARQ feedback for communications received using the first RAT over the first connection, and/or a channel sounding component 238 for generating and communicating a compressed V-matrix to the access point to facilitate performing beamforming. In an aspect, the term "component" as used in this disclosure may refer to one of the parts that make up a system, may be hardware or software or a combination of hardware and software, and/or may be divided into other components.

Figure 3:
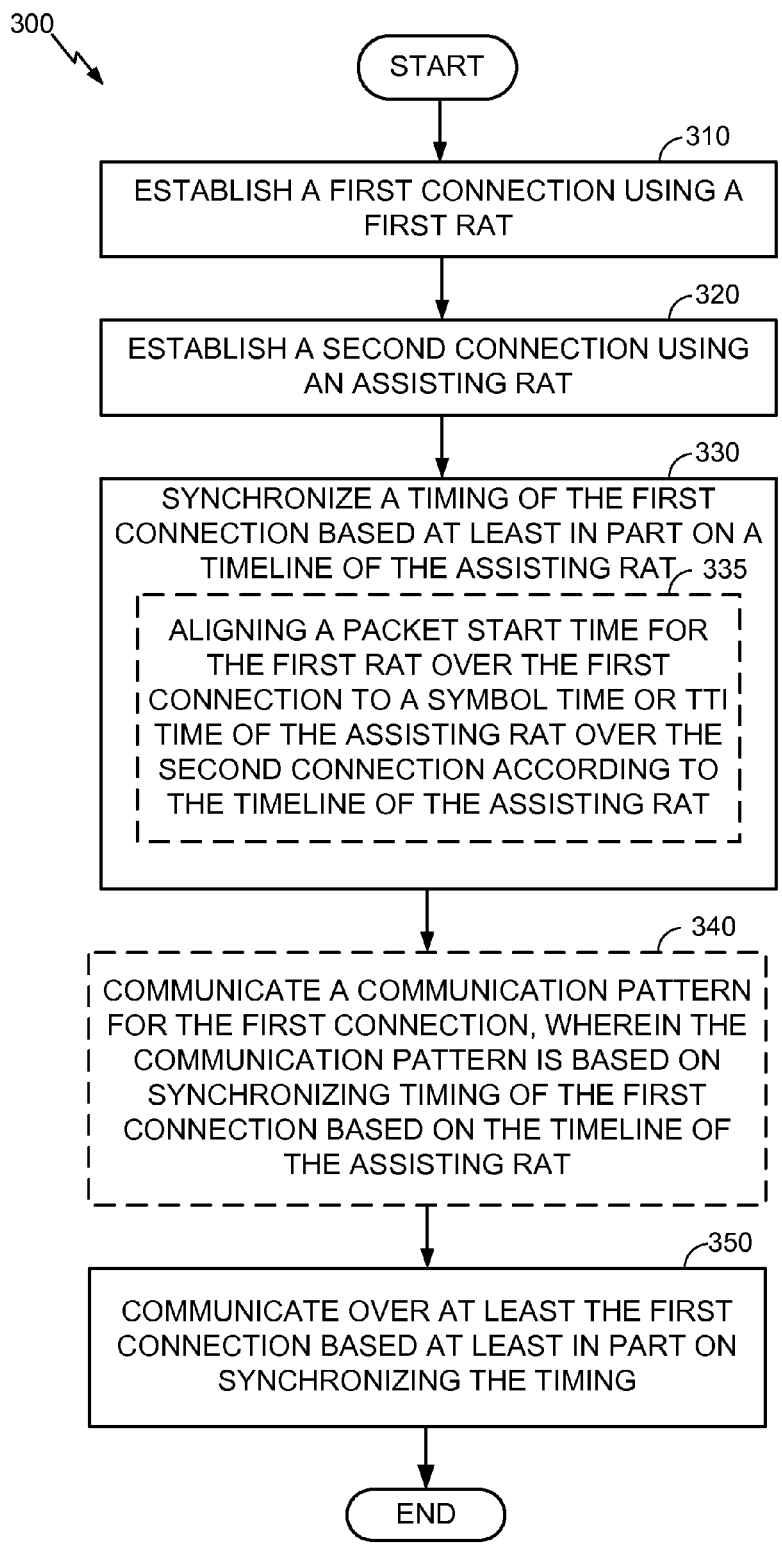
FIG. 3 is a flow diagram illustrating an example method of synchronizing a first RAT based on an assisting RAT.

FIG. 3 illustrates a flow diagram of an example method 300 for synchronizing timing between a first RAT and an assisting RAT in wireless communications. Method 300 includes, at Block 310, establishing a first connection using a first RAT. For example, first RAT radio 110 can establish the first connection using the first RAT with access point 106 and/or first RAT radio 112 can establish the first connection using the first RAT with access terminal 102 (FIGS. 1 and 2). The establishment of a connection may involve the successful completion of arrangements or procedures so that the access terminal 102 and the access point 106 can communicate. In one example, first RAT radio 110 can perform one or more access procedures to acquire resources from the access point 106 for communicating with the access point 106 using the first RAT (e.g., a random access channel (RACH) procedure), one or more authentication procedures for ensuring the access terminal 102 can communicate with the access point 106, etc. In one example, establishing the first connection using the first RAT may be performed after synchronizing timing at Block 330, as described below.

Method 300 also includes, at Block 320, establishing a second connection using an assisting RAT. For example, assisting RAT radio 114 can establish the second connection using the assisting RAT with access point 106 and/or assisting RAT radio 116 can establish the second connection using the assisting RAT with access terminal 102. In one example, assisting RAT radio 114 can perform one or more access procedures to acquire resources from the access point 106 for communicating with the access point 106 using the assisting RAT, one or more authentication procedures for ensuring the access terminal 102 can communicate with the access point 106, etc. In one example, establishing the second connection using the assisting RAT may be performed after synchronizing timing at Block 330, as described below.

Method 300 includes, at Block 330, synchronizing a timing of the first connection based at least in part on a timeline of the assisting RAT. First RAT synchronizing component 210 may synchronize the timing of the first connection (e.g., established or to be established via first RAT radio 110) based at least in part on the timeline of the assisting RAT. Similarly, for example, first RAT synchronizing component 230 may synchronize the timing of the first connection (e.g., established or to be established via first RAT radio 112) based at least in part on the timeline of the assisting RAT. For example, first RAT synchronizing component 210/230 may obtain the timeline of the assisting RAT based at least in part on determining the timeline of the second connection (if established) or otherwise based on a known timing used for the assisting RAT and/or a synchronized time (e.g., from a synchronized timing source related to the assisting RAT, such as one or more neighboring access points of the other RAT, global positioning system (GPS) timing, etc.). In an example, first RAT synchronizing component 210/230 may synchronize the timing of the first connection by aligning communications, frame/subframe/symbol, etc. timings related to the first RAT to communications, frame/subframe/symbol, etc. timings related to the assisting RAT.

In one example, synchronizing the timing at Block 330 may optionally include, at Block 335, aligning a packet start time for the first RAT over the first connection to a symbol time or transmission time interval (TTI) time of the assisting RAT over the second connection according to the timeline of the assisting RAT. First RAT synchronizing component 210/230 can align the packet start time for the first RAT over the first connection to the symbol time or TTI time of the assisting RAT over the second connection according to the timeline of the assisting RAT. For example, this can include aligning a first packet for transmitting using the first RAT with a beginning of a symbol, TTI, etc. of the assisting RAT. In an example, assisting RAT radio 114 may know the timeline for the assisting RAT based at least in part on synchronizing with the access point 106 (e.g., as part of establishing a connection therewith and/or the like). In another example, assisting RAT radio 116 may know or generate the timeline for the assisting RAT based on parameters received from one or more core network components, a timing source (e.g., GPS) at or coupled to the access point 106, etc. Specific examples of timing alignment for Wi-Fi and LTE are illustrated in FIG. 4.

Figure 4:
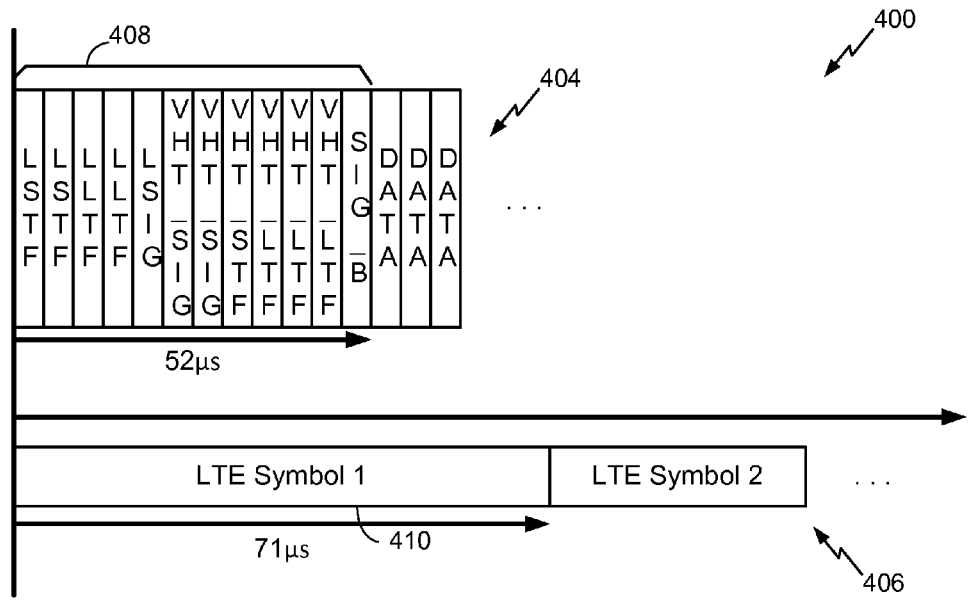
FIG. 4 illustrates example timelines for communicating using a first RAT and an assisting RAT.
Figure 4:
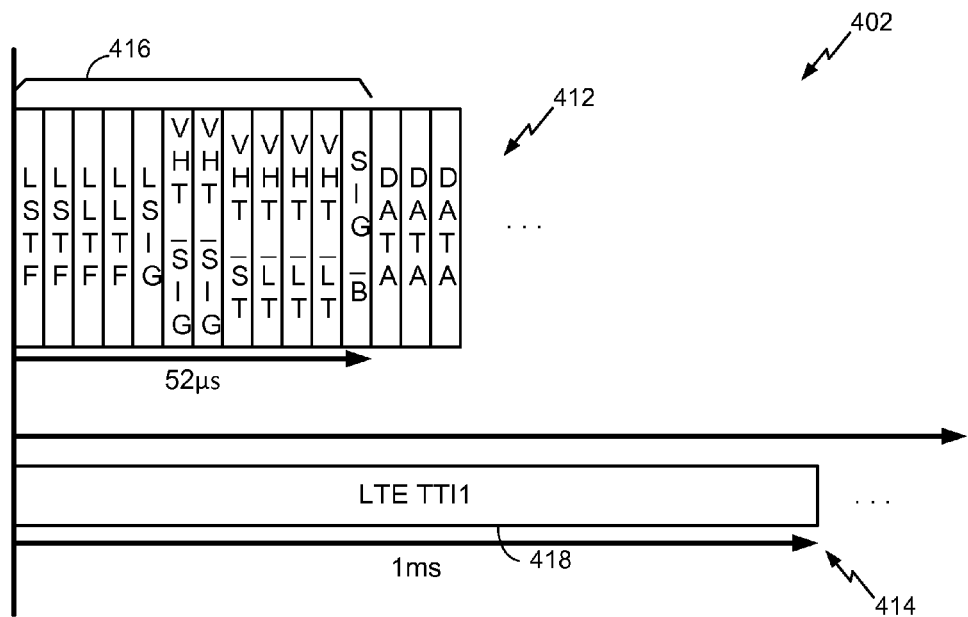

FIG. 4 illustrates example timelines 400 and 402 for synchronizing Wi-Fi based on timing of LTE. Timeline 400 depicts a Wi-Fi timeline 404 and an LTE timeline 406. In timeline 400, a packet start time in Wi-Fi can be defined by transmission of a series of packet preamble signals 408 before data transmission (such as one or more of a legacy short training field (LSTF), legacy long training field (LLTF), L-SIG, VHT-SIG (e.g., VHT-SIG-A), VHT-short training field (VHT-STF), VHT-long training field (VHT-LTF), and VHT-SIB-B (e.g., SIG-B) packet preambles). Transmission of these packet preamble signals 408 before Wi-Fi data can take approximately 52 microseconds (μs). In an example, first RAT synchronizing component 210/230 can align transmission of these packet preamble signals 408 with the beginning of an LTE orthogonal frequency division multiplexing (OFDM) symbol 410, which can be around 71 μs in duration. Timeline 402 similarly depicts a Wi-Fi timeline 412 and an LTE timeline 414. In timeline 402, the packet start time in Wi-Fi 416 is aligned with the beginning of an LTE TTI 418, which can include a 1 ms subframe in an example. It is to be appreciated that substantially any alignment is possible in this regard, so long as the access terminal 102 and access point 106 are aware of the alignment to facilitate synchronizing Wi-Fi based on the LTE timeline.

Synchronizing the airframe times of Wi-Fi and LTE in this regard allows for synchronizing preamble transmissions in Wi-Fi (and/or transmitting the preambles using an LTE connection), scheduling transmissions in Wi-Fi, providing HARQ feedback for transmissions in Wi-Fi at synchronized time intervals, collaboration among access points to perform beamforming for Wi-Fi, etc., as described further herein. In addition, for example, one or more neighboring Wi-Fi access points and/or access terminals (e.g., stations (STA)) can be synchronized in this regard.

Returning to the description of FIG. 3, method 300 may optionally include, at Block 340, communicating a communication pattern for the first connection, wherein the communication pattern is based on synchronizing timing of the first connection based on the timeline of the assisting RAT. First RAT synchronizing component 210/230 can communicate the communication pattern for the first connection, which may include first RAT synchronizing component 210 transmitting the communication pattern to the access terminal 102, and first RAT synchronizing component 230 accordingly receiving the communication pattern from the access terminal. For example, when access points and access terminals are synchronized for first RAT communications, it is possible that the access points and access terminals can follow, in their respective TX/RX cycle, a communication pattern specifying a DL/UL pattern (e.g., 1 subframe DL followed by 1 subframe UL, etc.), or any other pattern. In one example, the communication pattern may be similar to a time division duplexing (TDD) subframe configuration in LTE where a plurality of configurations can be configured in the access point 106 and/or access terminal 102, such that the access point can indicate a communication pattern by using an associated index. Each configured communication pattern in this example indicates whether subframes in a radio frame are to be configured for downlink or uplink communications (or a special subframe during which switching from downlink to uplink communications occurs).

Using a communication pattern for communicating using either DL or UL communications in a given time interval in this regard, allows for mitigating interference among various access points and access terminals that utilize the first RAT, and/or providing various possibilities for access point coordination (e.g., for interference coordination, collaboration, etc.), as described further herein. It is to be appreciated that the DL/UL cycle pattern can be flexible. In one example, the DL/UL pattern for the first RAT can be communicated by the access point to the access terminals (e.g., based on an index or other indication of the communication pattern), and may be communicated over the assisting RAT communications to improve likelihood of receiving the pattern, as described further herein.

Method 300 may also include, at Block 350, communicating over at least the first connection based at least in part on synchronizing the timing. First RAT radio 110 can communicate over at least the first connection (e.g., with access point 106) based at least in part on synchronizing the timing, and/or first RAT radio 112 can communicate over at least the first connection (e.g., with access terminal 102) based at least in part on synchronizing the timing. For example, this can include communicating data (e.g., user-plane data) for the first RAT over the first connection, though as described herein, some other first RAT communications, such as some control data, may be transmitted using assisting RAT communications to improve reliability and/or range of the other first RAT communications. In either case, communications over the first RAT may become synchronized in this regard where the communications may not have been synchronous without the alignment with the timeline of the assisting RAT.

Moreover, synchronizing the first RAT in this regard may help avoid issues such as the hidden node issue described above. For example, since the first RAT is synchronized and the bandwidth for transmission thereover may be known (e.g., based at least in part on scheduling, as described below), the access terminal 102 and the access point 106 can concurrently transmit legacy preamble where the first RAT is Wi-Fi. For example, concurrently communicating can refer to communicating (e.g., transmitting or receiving) over similar period of time (e.g., as synchronized between the first and second RATs). The receiving entity (e.g., access point 106 or access terminal 102, respectively) need not decode or process the preamble, as it can be transmitted for compatibility purposes with other Wi-Fi devices. Information carried in the preamble is already transmitted at the scheduling time via the assisting RAT link, as described herein. Thus, the hidden node problem can be avoided since transmission of the preambles is synchronized, and need not be decoded by the access point 106 or access terminal 102.

Figure 5:
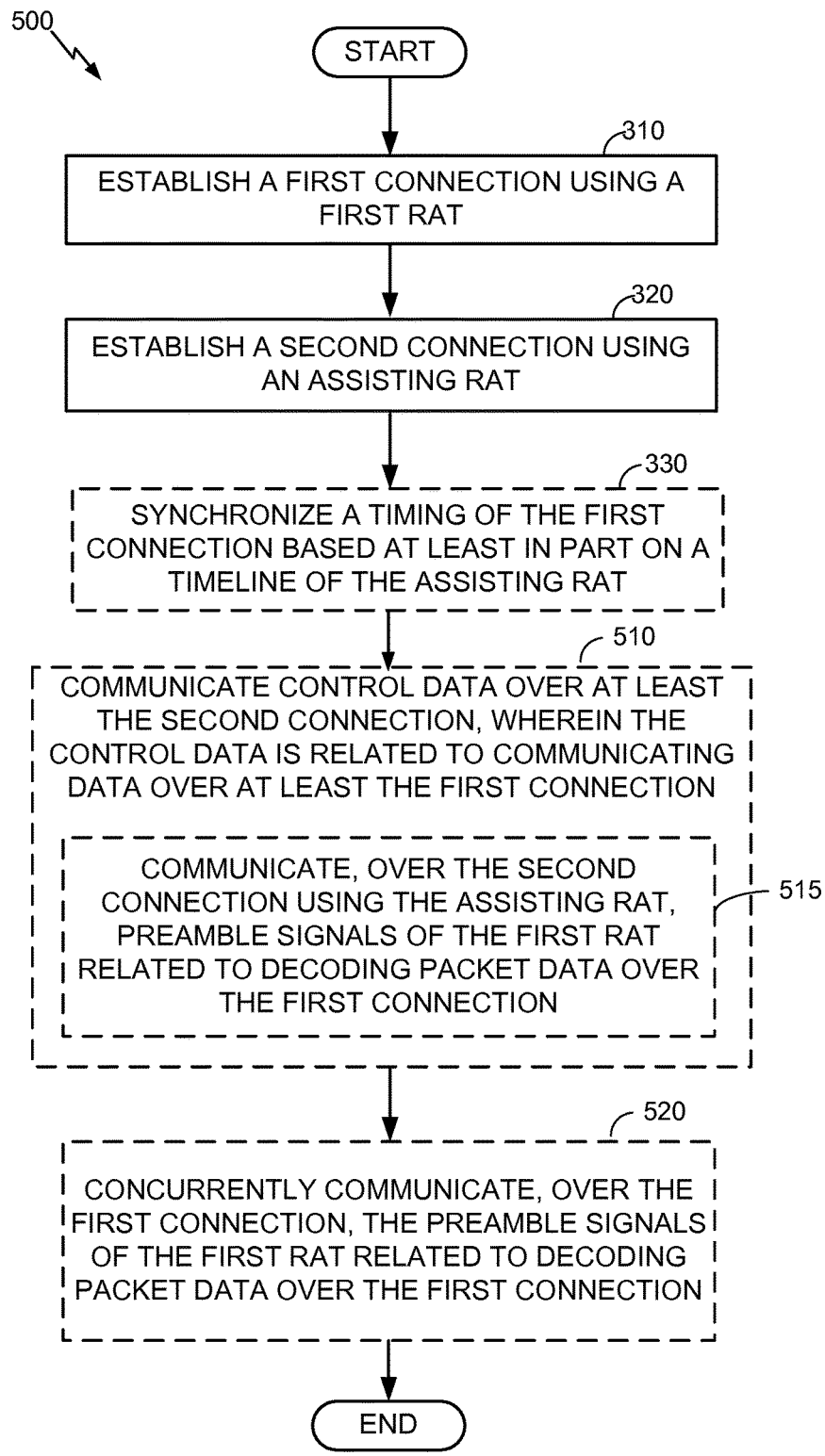
FIG. 5 is a flow diagram illustrating an example method for communicating preamble signals in wireless communications.

FIG. 5 illustrates a flow chart of an example method 500 for communicating a preamble for the first RAT over a connection that uses the assisting RAT. Method 500 includes, at Block 310, establishing a first connection using a first RAT. As described, this can include first RAT radio 110 establishing the first connection using the first RAT with access point 106 and/or first RAT radio 112 establishing the first connection using the first RAT with access terminal 102 (FIGS. 1 and 2). Method 500 may also include, at Block 320, establishing a second connection using an assisting RAT. As described, this can include assisting RAT radio 114 establishing the second connection using the assisting RAT with access point 106 and/or assisting RAT radio 116 establishing the second connection using the assisting RAT with access terminal 102. Method 500 can also optionally include, at Block 330, synchronizing a timing of the first connection based at least in part on a timeline of the assisting RAT. First RAT synchronizing component 210 may synchronize the timing of the first connection (e.g., established or to be established via first RAT radio 110) based at least in part on the timeline of the assisting RAT, as described above.

Method 500 can optionally include, at Block 510, communicating control data over at least the second connection, where the control data is related to communicating data over at least the first connection. Various components can communicate control data over at least the second connection, where the control data is related to communicating data over at least the first connection, such as preamble transmitting component 212, preamble receiving component 232, transmission scheduling component 214, grant receiving component 234, HARQ component 216 and/or 236, NDP transmitting component 218, channel sounding component 238, etc., as described herein. In addition, the first and second connections can have synchronized timings can facilitate certain control data communications for the first connection communicated over the second connection, as described herein.

In an example, communicating control data at Block 510 may optionally include, at Block 515, communicating, over the second connection using the assisting RAT, preamble signals of the first RAT related to decoding packet data over the first connection. Preamble transmitting component 212 can communicate (e.g., transmit), over the second connection using the assisting RAT (e.g., with access terminal 102), preamble signals of the first RAT related to decoding packet data over the first connection. Similarly, for example, preamble receiving component 232 may communicate (e.g., receive), over the second connection using the assisting RAT (e.g., with access point 106), preamble signals of the first RAT related to decoding packet data over the first connection. It is to be appreciated that preamble signals of the first RAT may be transmitted over control or data resources of the assisting RAT over the second connection. For example, the second connection that utilizes the assisting RAT can have various properties that facilitate improved reliability and/or extended range of communications. Thus, utilizing the second connection to communicate the preamble signals can facilitate improved reliability and/or extended range for communicating the preamble signals. It is to be appreciated that the preamble signals can include one or more preambles, as described herein. An example of utilizing an assisting RAT (e.g., LTE) connection to communicate a first RAT (e.g., Wi-Fi) preamble is depicted in FIG. 6.

Figure 6:
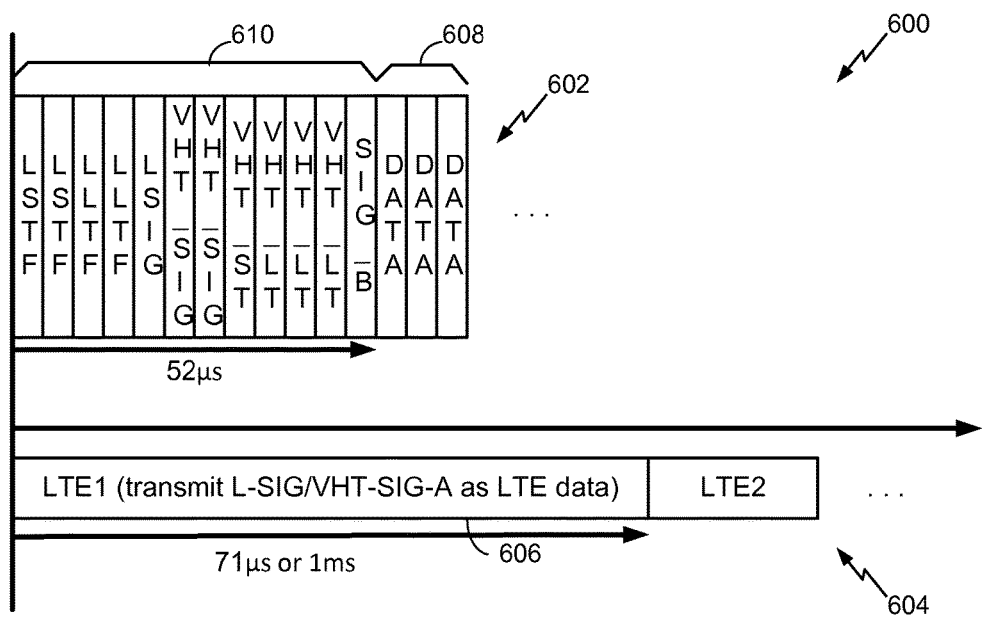
FIG. 6 illustrates example timelines for communicating preamble signals.

FIG. 6 illustrates an example timeline 600 for communicating a Wi-Fi preamble over an LTE connection. Timeline 600 includes a Wi-Fi timeline 602 and an LTE timeline 604, based on which the Wi-Fi timeline 602 can be synchronized, as described above. In a first LTE symbol or TTI 606, the Wi-Fi preamble can be transmitted as LTE data (e.g., using LTE resources assigned for user-plane data transmissions). For example, the Wi-Fi preamble can include various packet preambles 610 (e.g., one or more LSTF, LLTF, L-SIG, VHT-SIG, VHT-ST, VHT-LT, and SIG-B packets). These packet preambles in the Wi-Fi preamble may include information vital to decoding of packet data in Wi-Fi (e.g., MCS, bandwidth, etc.). When the preamble is transmitted using MCS 0 (e.g., binary phase shift keying (BPSK) rate 1/2) in Wi-Fi, L-SIG/VHT-SIG packet preambles may be a bottleneck limiting overall system coverage/range of Wi-Fi. This can be especially true when the data part of the packet is beamformed whereas the preamble part containing the SIGs is not (thus the full range of the beamformed BPSK is not achieved). Thus, preamble transmitting component 212 can transmit, and preamble receiving component 232 can receive, the preamble using the LTE connection (in LTE symbol/TTI 1 606) between the access point 106 and access terminal 102, which can improve reliability of receiving the preamble (e.g., based on HARQ feedback mechanisms used at the LTE physical layer, CRC, etc.). It is to be appreciated, however, that the Wi-Fi data 608 (e.g., user-plane data) can still be transmitted over the Wi-Fi connection.

Returning to the description of FIG. 5, method 500 may also optionally include, at Block 520, concurrently communicating, over the first connection, the preamble signals of the first RAT related to decoding packet data over the first connection. Preamble transmitting component 212 can concurrently communicate (e.g., transmit), over the first connection (e.g., with access terminal 102), preamble signals of the first RAT related to decoding packet data over the first connection. Similarly, for example, preamble receiving component 232 may communicate (e.g., receive), over the first connection (e.g., with access point 106), preamble signals of the first RAT related to decoding packet data over the first connection. This is further illustrated, in a specific example, in FIG. 6 where the preamble 610 is additionally transmitted on the Wi-Fi timeline 602 over the Wi-Fi connection. In this regard, preamble transmitting component 212 can additionally transmit the preamble over the Wi-Fi connection and the LTE connection (e.g., using first RAT radio 112 and assisting RAT radio 116), which may be received by access terminal 102 (e.g., over first RAT radio 110 and assisting RAT radio 114). In this example, preamble receiving component 232 may combine the preamble signals received over the first and second connections as part of processing the preamble signals. Receiving and processing two preamble signals in this regard may allow for improved reliability in properly receiving the preamble. In another example, additionally transmitting the preamble signals over the first connection may ensure compatibility with Wi-Fi devices. It is to be appreciated, as described, that communicating the preamble signals over the second connection using the assisting RAT is performed at the PHY layer to leverage the physical layer properties of the assisting RAT.

Moreover, in the VHT Wi-Fi packets, legacy preamble parts can be duplicated across all 20 MHz subband of the transmission. In previous configurations, the entity receiving the preamble (e.g., the access terminal 102) may not know the bandwidth in advance (e.g., it may be specified in the VHT preamble that comes later). Therefore, in such previous configurations, the fact that the legacy preamble is duplicated may not be used to improve performance. Usually, the access terminal 102 can either process the primary 20 MHz subband only, or run complex packet detection algorithm on multiple subbands in parallel. According to aspects described herein, however, if scheduling of the assisting RAT (e.g., LTE) is used (and/or the used bandwidth is signaled over the assisting RAT connection in advance in some other way), the bandwidth knowledge can be used by the access terminal 102 to combine the duplicated preamble fields to improve range/coverage. The improvement in performance can be significant if the preamble transmitted using the assisting RAT is coded with MCS0 and beamformed, while the legacy preamble is not.

Figure 7:
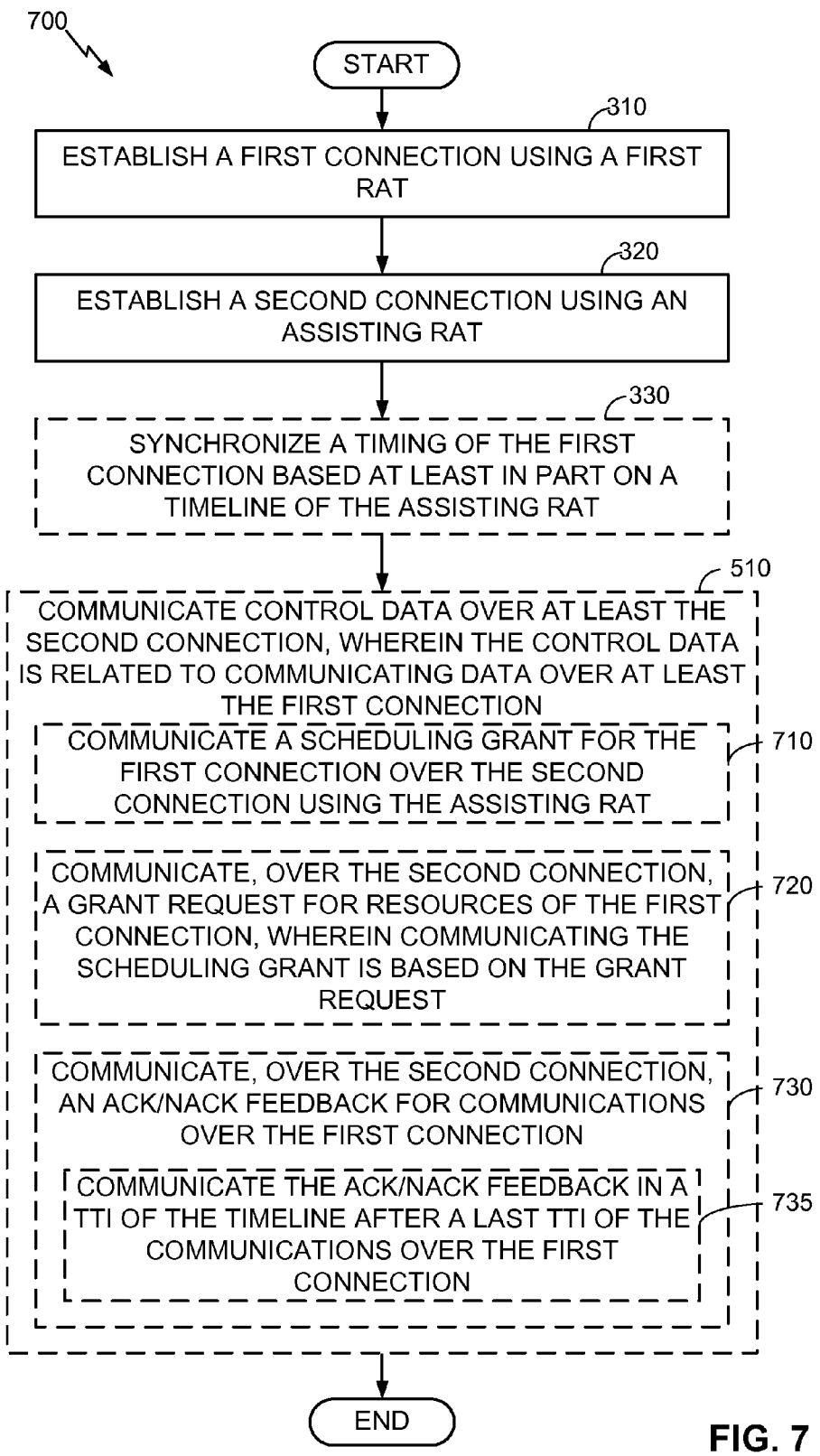
FIG. 7 is a flow diagram illustrating an example method for communicating scheduling grants and/or hybrid automatic repeat/request (HARQ) feedback in wireless communications.

FIG. 7 illustrates a flow chart of an example method 700 for leveraging physical layer communications of an assisting RAT in providing functions for the first RAT. Method 700 includes, at Block 310, establishing a first connection using a first RAT. As described, this can include first RAT radio 110 establishing the first connection using the first RAT with access point 106 and/or first RAT radio 112 establishing the first connection using the first RAT with access terminal 102 (FIGS. 1 and 2). Method 700 may also include, at Block 320, establishing a second connection using an assisting RAT. As described, this can include assisting RAT radio 114 establishing the second connection using the assisting RAT with access point 106 and/or assisting RAT radio 116 establishing the second connection using the assisting RAT with access terminal 102. Method 700 can also optionally include, at Block 330, synchronizing a timing of the first connection based at least in part on a timeline of the assisting RAT. First RAT synchronizing component 210 may synchronize the timing of the first connection (e.g., established or to be established via first RAT radio 110) based at least in part on the timeline of the assisting RAT, as described above.

Method 700 can optionally include, at Block 510, communicating control data over at least the second connection, where the control data is related to communicating data over at least the first connection. Various components can communicate control data over at least the second connection, where the control data is related to communicating data over at least the first connection, such as preamble transmitting component 212, preamble receiving component 232, transmission scheduling component 214, grant receiving component 234, HARQ component 216 and/or 236, NDP transmitting component 218, channel sounding component 238, etc., as described herein. In addition, the first and second connections can have synchronized timings can facilitate certain control data communications for the first connection communicated over the second connection, as described herein.

In an example, communicating control data at Block 510 may optionally include, at Block 710, communicating a scheduling grant for the first connection over the second connection using the assisting RAT. Transmission scheduling component 214 can communicate the scheduling grant for the first connection over the second connection using the assisting RAT (e.g., to the access terminal 102 using assisting RAT radio 116). For example, transmission scheduling component 214 can generate the scheduling grant for the first connection based on one or more considerations of the first RAT radio (e.g., resources scheduled for other access terminals), and can utilize the physical layer assisting RAT connection to transmit the scheduling grant for the first connection. For example, this can include transmission scheduling component 214 transmitting the scheduling grant using control or data resources of the assisting RAT. In this example, grant receiving component 234 can receive the scheduling grant over the control or data resources of the assisting RAT, and can utilize resources indicated by the scheduling grant to communicate with the access point 106 (and/or other access points 106) over the resources. As described, this can improve reliability of receiving the scheduling grant, extend a range for receiving the scheduling grant, etc. The scheduling grant may include an indication of resources over which the access terminal 102 is to expect to receive downlink communications from the access point 106 (and/or other access points), resources over which the access terminal 102 is to transmit uplink communications to the access point 106, etc., where the resources may specify a frequency range to be utilized for the communications, one or more subframes or portions thereof to be utilized for the communications, etc.

Moreover, in an example, the scheduling grant may include one or more preamble fields related to the first RAT data transmissions (e.g., L-SIG, VHT-SIG, etc.). In this example, preamble transmitting component 212 can include the one or more preamble fields in the scheduling grant. Grant receiving component 234 can receive the scheduling grant, and preamble receiving component 232 can obtain the one or more preamble fields from the scheduling grant. Preamble receiving component 232, for example, can utilize the one or more preamble fields in decoding subsequent data communications received over first RAT radio 110 from access point 106 (and/or other access points). Communicating the preamble for the first RAT in the scheduling grant over the second connection, in this example, can decrease signaling overhead for the first RAT communications.

Figure 8:
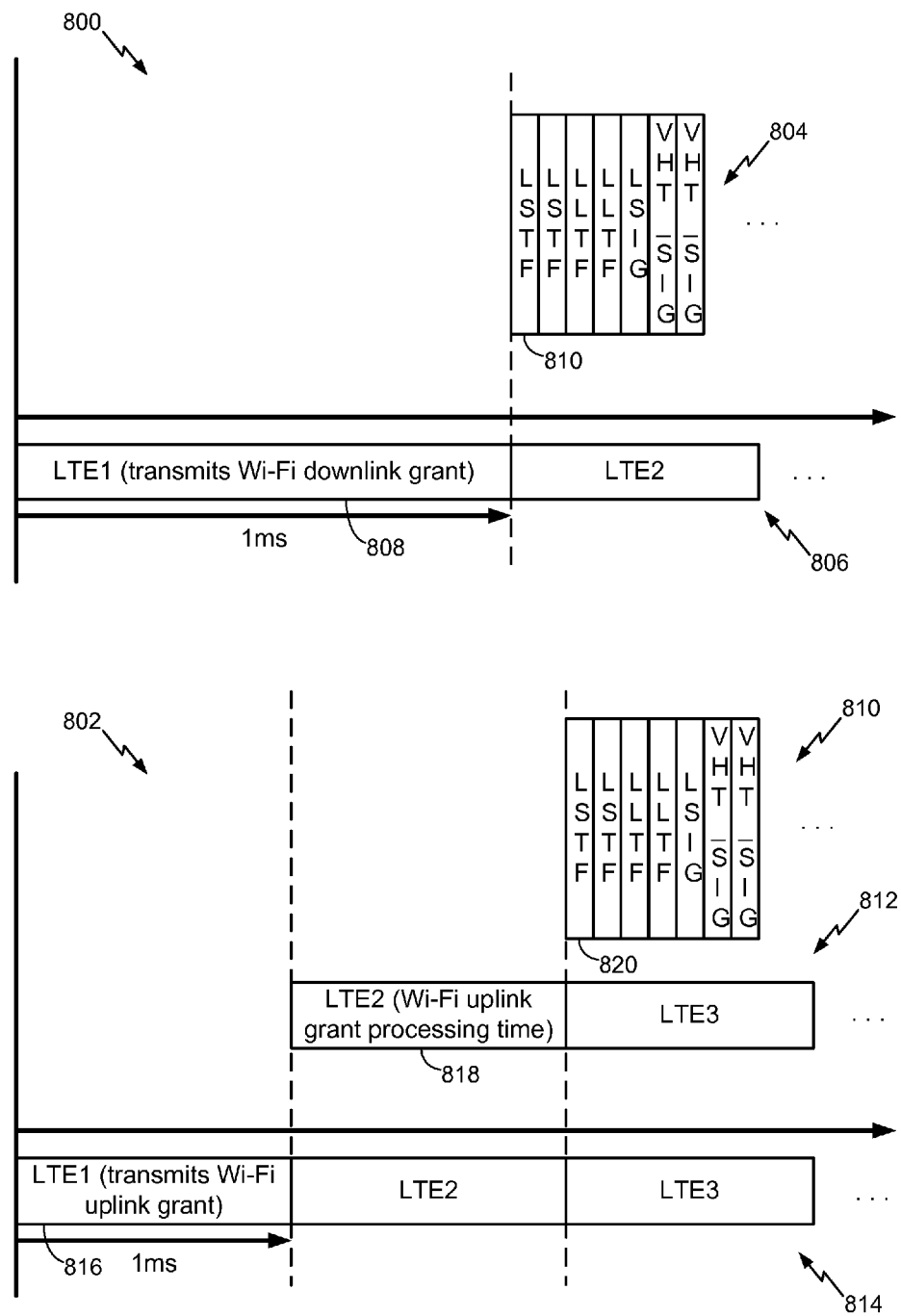
FIG. 8 illustrates example timelines for communicating scheduling grants.

In another example, communicating control data at Block 510 may optionally include, at Block 720, communicating, over the second connection, a grant request for resources of the first connection, wherein communicating the scheduling grant is based on the grant request. Grant receiving component 234 can communicate, over the second connection using the assisting RAT, the grant request for resources of the first connection. For example, transmission scheduling component 214 can receive the grant request over the connection, and can generate and transmit the scheduling grant based on the grant request, as described. In one example, the grant request may include an amount of resources requested, a quality of service (QoS) for one or more services for which the resources are requested, etc. Thus, in an example, transmission scheduling component 214 can generate the scheduling grant based at least in part on such information. In any case, grant receiving component 234 can then receive the scheduling grant for the first connection from the access point 106 over the second connection using the assisting RAT. First RAT radios 110 and 112 can communicate over the first connection using the first RAT based on the scheduling grant, which may include scheduling of resources for uplink and/or downlink communications. FIG. 8 illustrates a specific example of communicating scheduling grants for the first RAT by using the assisting RAT connection at the physical layer.

FIG. 8 illustrates example timelines 800 and 802 for communicating scheduling grants for a first RAT connection using an assisting RAT connection at the physical layer, specifically where the first RAT is Wi-Fi and the assisting RAT is LTE. Timeline 800 includes a Wi-Fi downlink timeline 804 and an LTE downlink timeline 806. As illustrated, for example, transmission scheduling component 214 can transmit a downlink scheduling grant for the Wi-Fi connection (e.g., from an access point 106 to an access terminal 102) over an LTE connection during an LTE TTI, symbol, etc. (labeled LTE1), to which the Wi-Fi connection is synchronized as described, at 808. For example, the scheduling grant can be transmitted using a control or data channel of the LTE connection. Wi-Fi transmission can then occur at 810 over resources indicated in the scheduling grant. Thus, for example, grant receiving component 234 can receive the downlink scheduling grant from access point 106 (e.g., as generated by transmission scheduling component 214), and first RAT radio 110 can accordingly receive communications from the access point 106 over resources indicated in the scheduling grant. This may be based on a grant request transmitted by the access terminal 102, as described, which may be part of establishing the first connection using the first RAT.

In another example, timeline 802 includes a Wi-Fi uplink timeline 810, an LTE uplink timeline 812, and an LTE downlink timeline 814. As illustrated, for example, a scheduling grant for uplink resources on the Wi-Fi connection can be transmitted (e.g., from an access point 106 to an access terminal 102) using the assisting LTE connection during an LTE TTI, symbol, etc. (labeled LTE1) at 816. For example, the scheduling grant can be transmitted using a control or data channel of the LTE connection. The scheduling grant can be received and processed at the access terminal 102 over the assisting LTE connection at a next LTE TTI, symbol, etc. (labeled LTE2) at 818 (e.g., by grant receiving component 234). Accordingly, the access terminal 102 can transmit Wi-Fi packets (e.g., via first RAT radio 110) aligned with the beginning of an LTE TTI, symbol, etc. (labeled LTE3) following LTE2. In an example, grant receiving component 234 can transmit a grant request to the access point 106 requesting the scheduling grant for the uplink Wi-Fi resources.

In one example, the scheduling grant generated and transmitted by transmission scheduling component 214 may include L-SIG and VHT-SIG information, or other preamble fields, for a related Wi-Fi transmission, as described above, and thus first RAT radio 110 can transmit the L-SIG and VHT-SIG information to transmit the related packets at 810 or 820. Moreover, in an example, transmission scheduling component 214 may schedule the access terminal 102 and/or other access terminals over one or more 20 MHz subbands. This can achieve an effect similar to OFDM access (OFDMA) in LTE while remaining compliant with Wi-Fi waveform specifications in each subband. The one or more subbands may be assigned to each of multiple access terminals 102 based on channel conditions at each of the multiple access terminals 102. In addition, MCS for each subband may be set separately such that the access point 106 can provide access over a single wideband carrier, multiple independent carriers, and/or the like to optimize system performance.

Returning to the description of FIG. 7, communicating control data at Block 510, may also optionally include, at Block 730, communicating, over the second connection, an ACK/NACK feedback for communications over the first connection. HARQ component 216 can communicate, over the second connection using the assisting RAT, ACK/NACK feedback for communications received over the first connection from access terminal 102. In another example, HARQ component 236 can communicate, over the second connection using the assisting RAT, ACK/NACK feedback for communications received over the first connection from the access point 106. In an example, communicating the ACK/NACK feedback at Block 730 may optionally include, at Block 735, communicating the ACK/NACK feedback in a TTI of the timeline after a last TTI of the communications over the first connection. A specific example of communicating ACK/NACK feedback for physical layer Wi-Fi communications over an assisting LTE connection is illustrated in FIG. 9.

Figure 9:
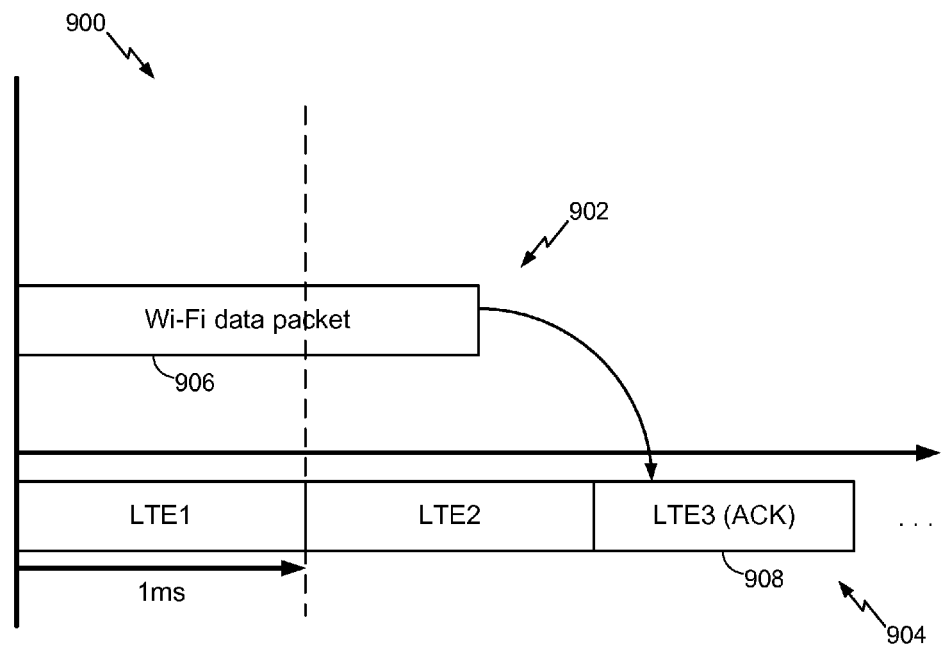
FIG. 9 illustrates example timelines for communicating HARQ feedback.

FIG. 9 illustrates an example timeline for communicating ACK/NACK (HARQ) feedback for a Wi-Fi packet using an assisting LTE connection. Timeline 900 includes a Wi-Fi uplink timeline 902 and an LTE downlink timeline 904. A Wi-Fi data packet 906 can be transmitted over a Wi-Fi connection (e.g., from an access terminal 102 to an access point 106) aligned with an LTE TTI, symbol, etc. (labeled LTE1) of an assisting LTE connection. In an LTE TTI, symbol etc. (labeled LTE3) following the last LTE TTI, symbol, etc. (labeled LTE2) in which the Wi-Fi data packet is transmitted, HARQ component 216 can transmit HARQ feedback (e.g., ACK/NACK indicator) using the assisting LTE connection at LTE3 908. The feedback can accordingly be received over the assisting LTE connection and processed (e.g., by HARQ component 236) to determine whether to retransmit the Wi-Fi data packet (e.g., using the first RAT radio 110). For example, this can avoid stringent latency requirements associated with using only Wi-Fi without an assisting RAT (e.g., sending ACK/NACK feedback at a short interframe space (SIFS) duration of 16 μs after the Wi-Fi data packet is received). Moreover, this can also avoid interference in the Wi-Fi system otherwise caused by transmitting ACK/NACK feedback using the Wi-Fi connection (e.g., to a hidden node that cannot hear the data packet but may be disturbed by the ACK/NACK feedback) by moving the ACK/NACK feedback to the assisting LTE connection. Moving the ACK/NACK feedback to the assisting LTE connection can additionally avoid overhead in the Wi-Fi system caused by transmitting the ACK/NACK feedback plus the SIFS duration, as well as range limitations for transmitting the ACK/NACK where Wi-Fi access points may have more antennas than access terminals transmitting the feedback (e.g., as the LTE connection is associated with more reliable communications).

Moreover, in an example, HARQ component 216 and/or 236 can additionally selectively communicate retransmitted packets over the assisting RAT connection (e.g., using assisting RAT radio 116 or 114). This can improve reliability of receiving the retransmitted packet, as described herein. The HARQ component 216 and/or 236 of the receiving entity (e.g., the access point 106 or access terminal 102, respectively) may combine packets that were not successfully received over the respective first RAT radio 112 or 110 with the retransmitted packets. Furthermore, in an example, HARQ components 216 and/or 236 may implement incremental redundancy in retransmitted packets such to utilize different coded bits for one or more retransmissions than were used for the original transmission and/or previous retransmissions. This may additionally increase likelihood of successfully receiving one or more retransmissions. In still another example, HARQ components 216 and/or 236 may determine (e.g. using heuristics or some other mechanism), or may otherwise receive from another component or entity, a set of identified bits that may provide a maximum value of the coded bits. In any case, likelihood of receiving retransmitted packets that failed over the Wi-Fi link may be improved in this regard.

Figure 10:
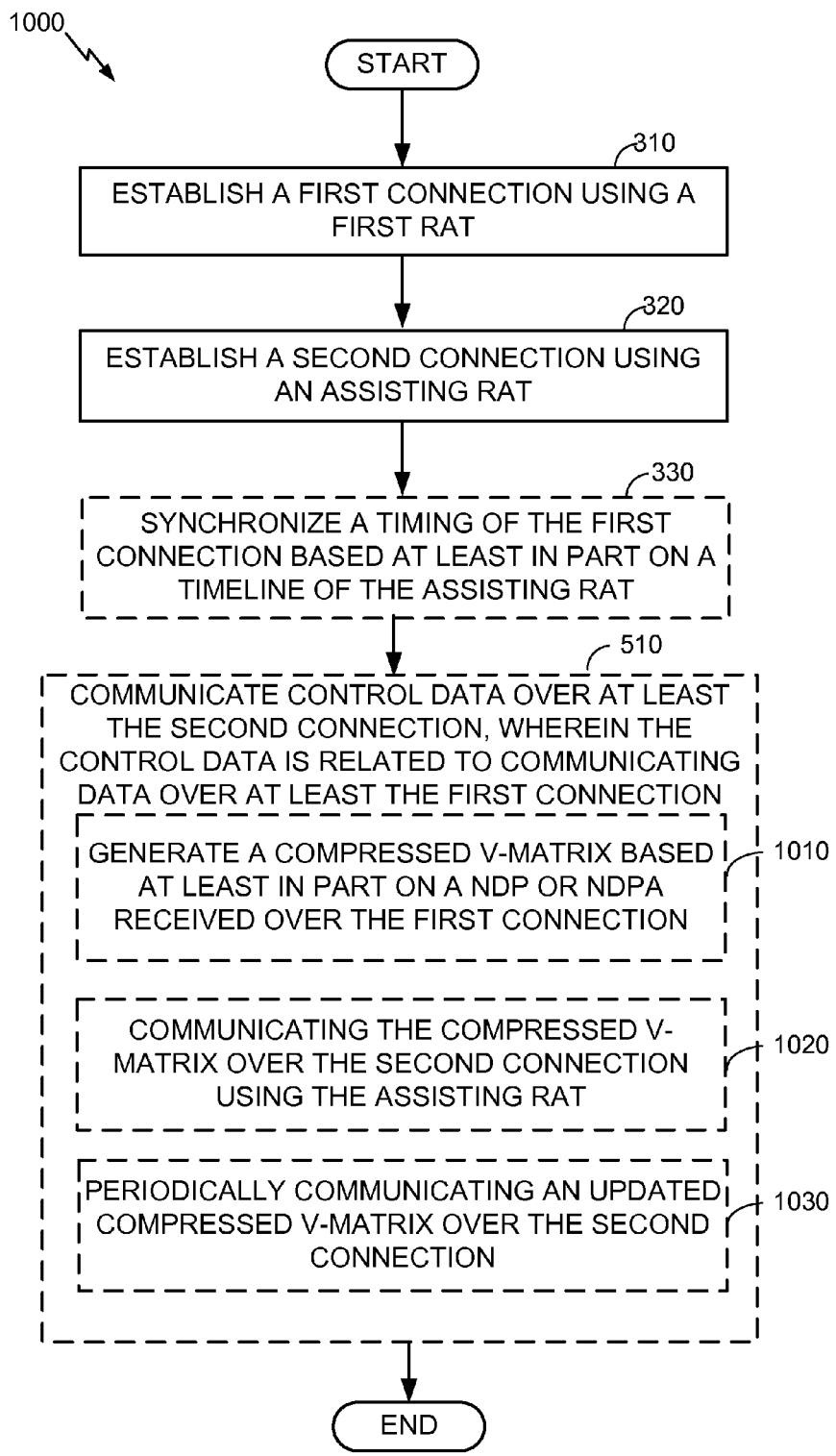
FIG. 10 is a flow diagram illustrating an example method for communicating a compressed V-matrix in wireless communications.

FIG. 10 illustrates a flow chart of an example method 1000 for communicating a compressed V-matrix for a first RAT over a connection with an assisting RAT. Method 1000 includes, at Block 310, establishing a first connection using a first RAT. As described, this can include first RAT radio 110 establishing the first connection using the first RAT with access point 106 and/or first RAT radio 112 establishing the first connection using the first RAT with access terminal 102 (FIGS. 1 and 2). Method 1000 may also include, at Block 320, establishing a second connection using an assisting RAT. As described, this can include assisting RAT radio 114 establishing the second connection using the assisting RAT with access point 106 and/or assisting RAT radio 116 establishing the second connection using the assisting RAT with access terminal 102. Method 1000 can also optionally include, at Block 330, synchronizing a timing of the first connection based at least in part on a timeline of the assisting RAT. First RAT synchronizing component 210 may synchronize the timing of the first connection (e.g., established or to be established via first RAT radio 110) based at least in part on the timeline of the assisting RAT, as described above.

Method 1000 can optionally include, at Block 510, communicating control data over at least the second connection, where the control data is related to communicating data over at least the first connection. Various components can communicate control data over at least the second connection, where the control data is related to communicating data over at least the first connection, such as preamble transmitting component 212, preamble receiving component 232, transmission scheduling component 214, grant receiving component 234, HARQ component 216 and/or 236, NDP transmitting component 218, channel sounding component 238, etc., as described herein. In addition, the first and second connections can have synchronized timings can facilitate certain control data communications for the first connection communicated over the second connection, as described herein.

In an example, communicating control data at Block 510 may optionally include, at Block 1010, generating a compressed V-matrix based at least in part on a NDP or NDP announcement (NDPA) received over the first connection. Channel sounding component 238 can generate the compressed V-matrix based at least in part on the NDP or NDPA received over the first connection, as performed in Wi-Fi. For example, NDP transmitting component 218 may transmit the NDP or NDPA, based on which channel sounding component 238 generates the compressed V-matrix as channel state information related to the NDP or NDPA. Channel sounding component 238 can generate compressed V-matrices for NDP or NDPA received from multiple access points, in one example, to allow the access points to perform beamforming.

Thus, communicating control data at Block 510 can also optionally include, at Block 1020, communicating the compressed V-matrix over the second connection using the assisting RAT. Channel sounding component 238 can communicate the compressed V-matrix over the second connection using the assisting RAT. As described, using the second connection with the assisting RAT can improve reliability of transmitting the compressed V-matrix to the access point. In addition, the access point 106 can beamform subsequent data transmissions to the access terminal 102 using first RAT radio 112 based at least in part on the compressed V-matrix. A specific example of transmitting the compressed V-matrix is illustrated in FIG. 11.

Communicating control data at Block 510 can also optionally include, at Block 1030, periodically communicating an updated compressed V-matrix over the second connection. Channel sounding component 238 can periodically communicate the updated compressed V-matrix over the second connection that uses the assisting RAT. For example, the quality of a channel may decrease (or increase) over time, and thus periodically generating and transmitting the compressed V-matrix in this regard can account for changes in channel quality. For example, channel sounding component 238 can determine the periodicity (e.g., when to transmit the compressed V-matrix updates) based at least in part on utilizing a timer or based on one or more detected events (e.g., channel quality decreasing, increasing, or otherwise changing more or less than a threshold (over a period of time or otherwise).

Figure 11:
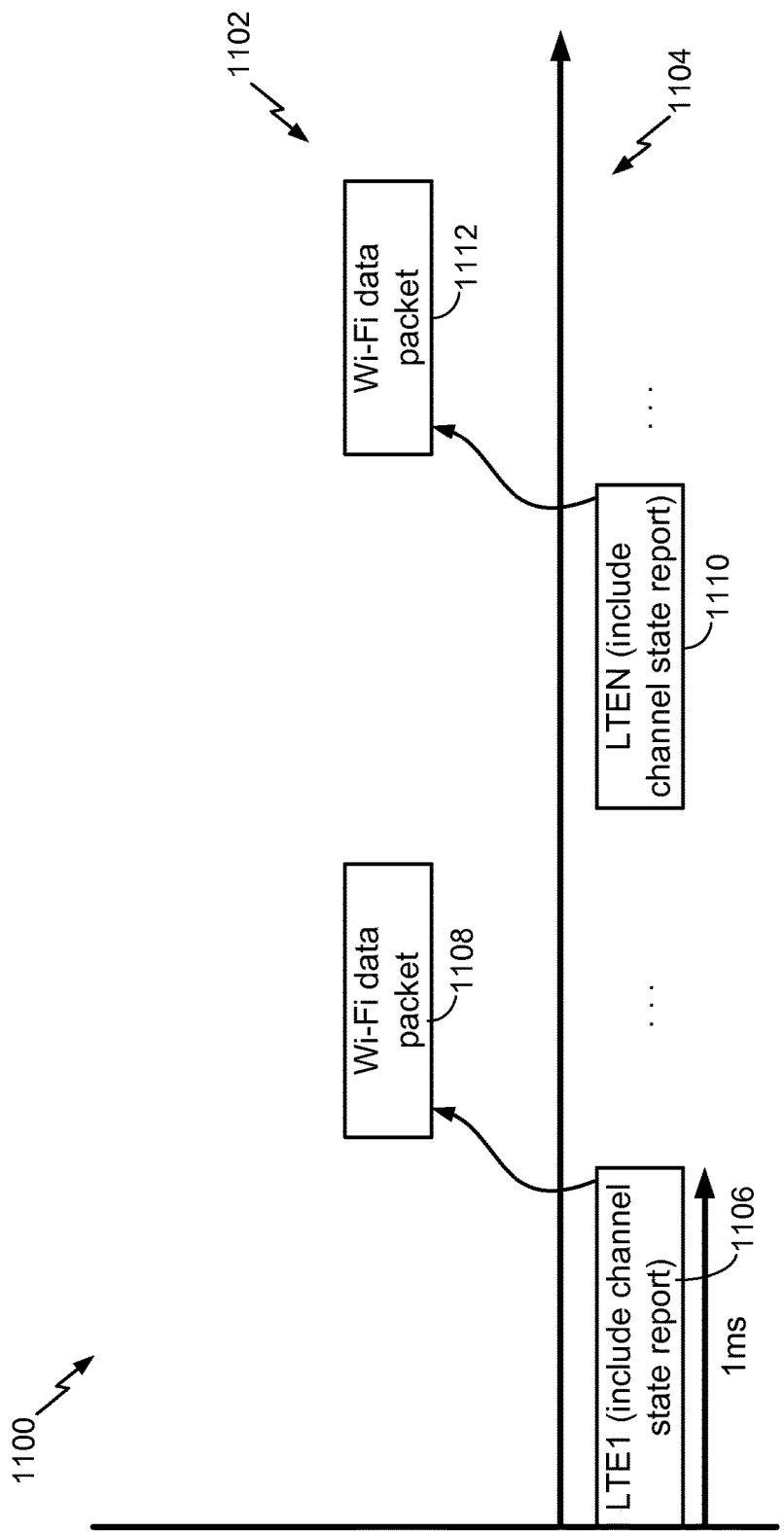
FIG. 11 illustrates example timelines for communicating compressed V-matrices.

FIG. 11 illustrates an example timeline 1100 for communicating a compressed V-matrix, and beamforming based on the compressed V-matrix. Timeline 1100 includes a Wi-Fi downlink timeline 1102 and an LTE uplink timeline 1104. For example, channel sounding component 238 can transmit a compressed V-matrix or other channel state report in an LTE TTI, symbol, etc. (labeled LTE1) over the assisting LTE RAT (e.g., to the access point 106) at 1106. A Wi-Fi data packet can accordingly be transmitted using beamforming based on the compressed V-matrix at 1108 (e.g., transmitted from the access point 106 to an access terminal 102). Similarly, in a subsequent LTE TTI, symbol, etc. (labeled LTEN), channel sounding component 238 can transmit an updated compressed V-matrix or other channel state report over the assisting LTE RAT at 1110. A Wi-Fi data packet can accordingly be transmitted using beamforming based on the updated compressed V-matrix at 1112.

Figure 12:
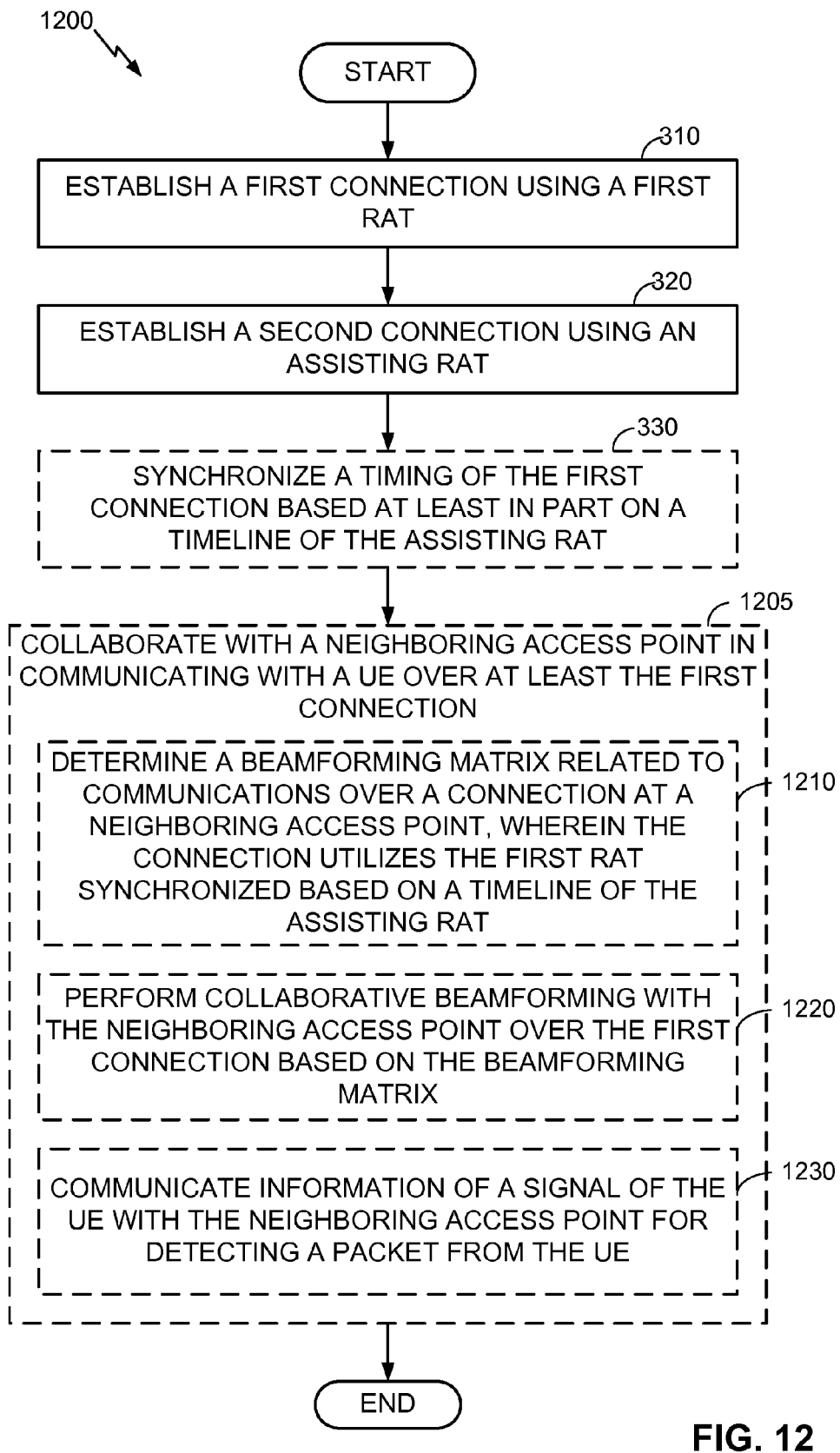
FIG. 12 is a flow diagram illustrating an example method for performing collaboration among access points in wireless communications.

FIG. 12 illustrates a flow chart of an example method 1200 for performing collaboration among access points using a first RAT that is synchronized based on an assisting RAT. Method 1200 includes, at Block 310, establishing a first connection using a first RAT. As described, this can include first RAT radio 110 establishing the first connection using the first RAT with access point 106 and/or first RAT radio 112 establishing the first connection using the first RAT with access terminal 102 (FIGS. 1 and 2). Method 1200 may also include, at Block 320, establishing a second connection using an assisting RAT. As described, this can include assisting RAT radio 114 establishing the second connection using the assisting RAT with access point 106 and/or assisting RAT radio 116 establishing the second connection using the assisting RAT with access terminal 102. Method 1200 can also optionally include, at Block 330, synchronizing a timing of the first connection based at least in part on a timeline of the assisting RAT. First RAT synchronizing component 210 may synchronize the timing of the first connection (e.g., established or to be established via first RAT radio 110) based at least in part on the timeline of the assisting RAT, as described above Method 1200 can optionally include, at Block 1205, collaborating with a neighboring access point in communicating with a UE over at least the first connection. Access point collaborating component 220 can collaborate with the neighboring access point (e.g., neighboring access point 250) in communicating with the UE (e.g., access terminal 102) over at least the first connection. For example, access point 106 can communicate with an access terminal 102 using first RAT radio 112 and assisting RAT radio 116, as described, and a neighboring access point 250 can similarly communicate with access terminal 102. As the first RAT communications can be synchronized based on the assisting RAT timeline, access point 106 and one or more neighboring access points 250 can collaborate to provide additional advantageous functionality. For example, access point collaborating component 220 can exchange information with (or otherwise provide information to) one or more neighboring access points 250 to improve service provided by the access point 106 (and/or by neighboring access points 250).

For example, collaborating with the neighboring access point at Block 1205 can optionally include, at Block 1210, determining a beamforming matrix related to communications over a connection at a neighboring access point, wherein the connection utilizes the first RAT synchronized based on a timeline of the assisting RAT. Access point collaborating component 220 can determine the beamforming matrix related to communications over the connection at the neighboring access point 250. For example, the beamforming matrix may also relate communications over the connection at the access point 106. For instance, neighboring access point 250 may also be communicating with access terminal 102, and may receive one or more V-matrices from the access terminal 102 that relate to the connection with the access terminal 102. V-matrices related to communications between the access terminal 102 and access point 106, and between the access terminal 102 and neighboring access point 250, may be combined to generate a beamforming matrix. In another example, access point collaborating component 220 can receive the beamforming matrix from neighboring access point 250, which computes the beamforming matrix for the access point 106. Moreover, in an example, access point collaborating component 220 may transmit a V-matrix received from the access terminal 102 to the neighboring access point 250 to facilitate beamforming matrix determination by the neighboring access point 250. In any case, because the access point 106 and neighboring access point 250 both synchronize the first RAT based on the assisting RAT, the access points can perform collaborative functions in this regard.

Thus, for example, collaborating with the neighboring access point at Block 1205 may also include, at Block 1220, performing collaborative beamforming with the neighboring access point over the first connection based on the beamforming matrix. Access point collaborating component 220 can perform the collaborative beamforming with the neighboring access point 250 over the first connection based on the beamforming matrix. Thus, for example, the access points 106 and 250 can each receive a V-matrix from the access terminal 102 based on channel response from each access point 106 and 250 at the access terminal 102. Channel sounding component 238, in an example, can generate the V-matrices and can transmit the V-matrices to each of the access points 106 and 250 (e.g., over the assisting RAT connection or otherwise). The access points 106 and 250 receive the V-matrices from the access terminal, as described, and can communicate the V-matrices via access point collaborating components 220 (e.g., over a backhaul connection between the access points and/or related network nodes) to determine a beamforming matrix for communicating with the access terminal 102. Because the access points use the first RAT that is synchronized (based on the assisting RAT), the access points can beamform communications to the access terminal 102 based on the V-matrices, which can relate to communications of the first RAT received at similar synchronized times.

Moreover, it is to be appreciated that access points can collaborate in other regards as well. For example, collaborating with the neighboring access point at Block 1205 may also include, at Block 1230, communicating information of a signal of the UE from the neighboring access point for detecting a packet from the UE. Access point collaborating component 220 can communicate information of a signal of the UE (e.g., access terminal 102) with the neighboring access point 250 for detecting a packet from the UE. For example, the information may correspond to I/Q samples of signals received from the access terminal 102. Access point collaborating component 220 can then combine the information (e.g., the I/Q samples) of multiple signals to increase the probability of correctly detecting the signal or a related packet from the access terminal 102. It is to be appreciated that introducing UL/DL collaboration in a Wi-Fi only network, without the assistance of another RAT, would likely be complex, but can be facilitated based at least on synchronizing the access points based on the assisting RAT, as described herein. Moreover, using the assisting RAT for HARQ feedback, as described above, may lower ACK latency to allow enough time for uplink collaboration and combining related to signals received from access terminals 102, as described above.

Figure 13:
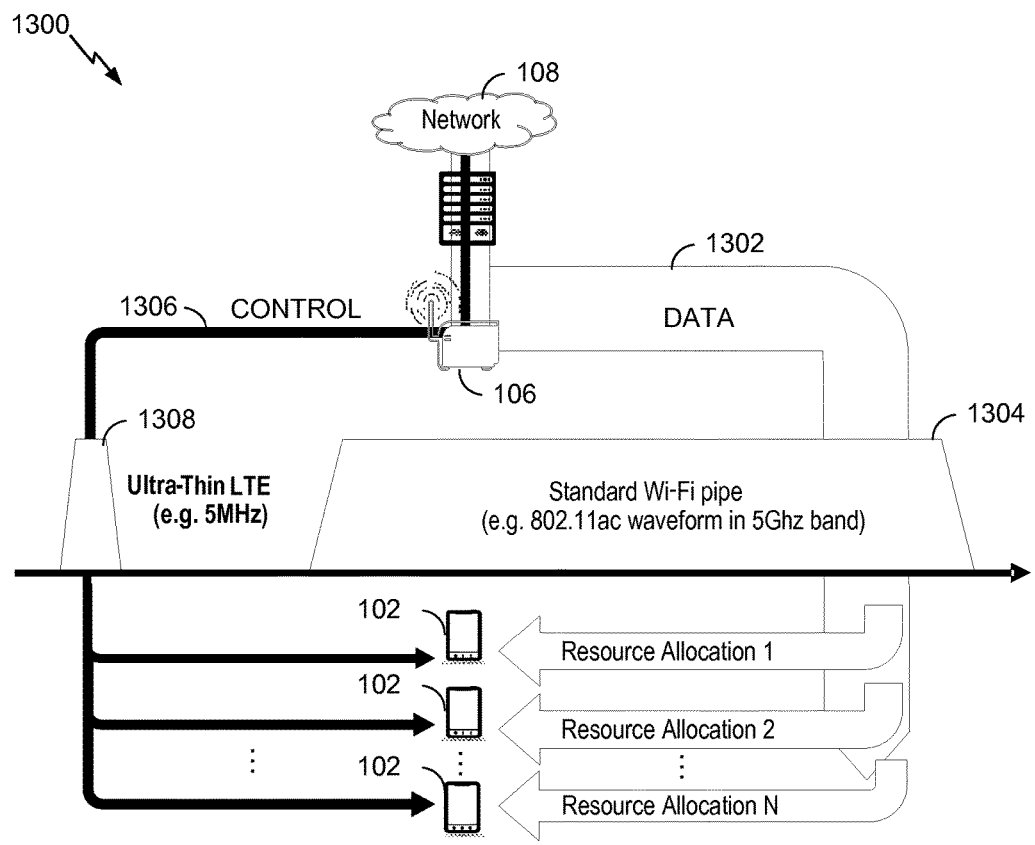
FIG. 13 illustrates a block diagram of an example system for employing a first RAT and an assisting RAT to perform wireless communications.

FIG. 13 illustrates an example system 1300 for communicating using a first RAT (e.g., Wi-Fi) and using an assisting RAT (e.g., LTE) for synchronizing the first RAT, for communicating some communications at the physical layer, etc., as described above. System 1300 includes an access point 106 that communicates with one or more network entities 108 of a network and one or more access terminals. Communications between the access terminals 102 and access point 106 can occur at least partially over a Wi-Fi connection 1304 (e.g., for data communications 1302) at the physical layer and at least partially over an LTE connection 1308 (e.g., for control communications 1306 related to the data communications 1302) at the physical layer. In an example, the LTE connection 1308 may utilize a 5 megahertz (MHz) or other thin frequency band. In any case, physical layer properties of LTE are leveraged in this regard (e.g., to synchronize the Wi-Fi data communications 1302, to scheduling the Wi-Fi data communications 1302, to provide a more reliable link for ACK/NACK feedback or other control data associated with the Wi-Fi data communications 1302, etc.).

Figure 14:
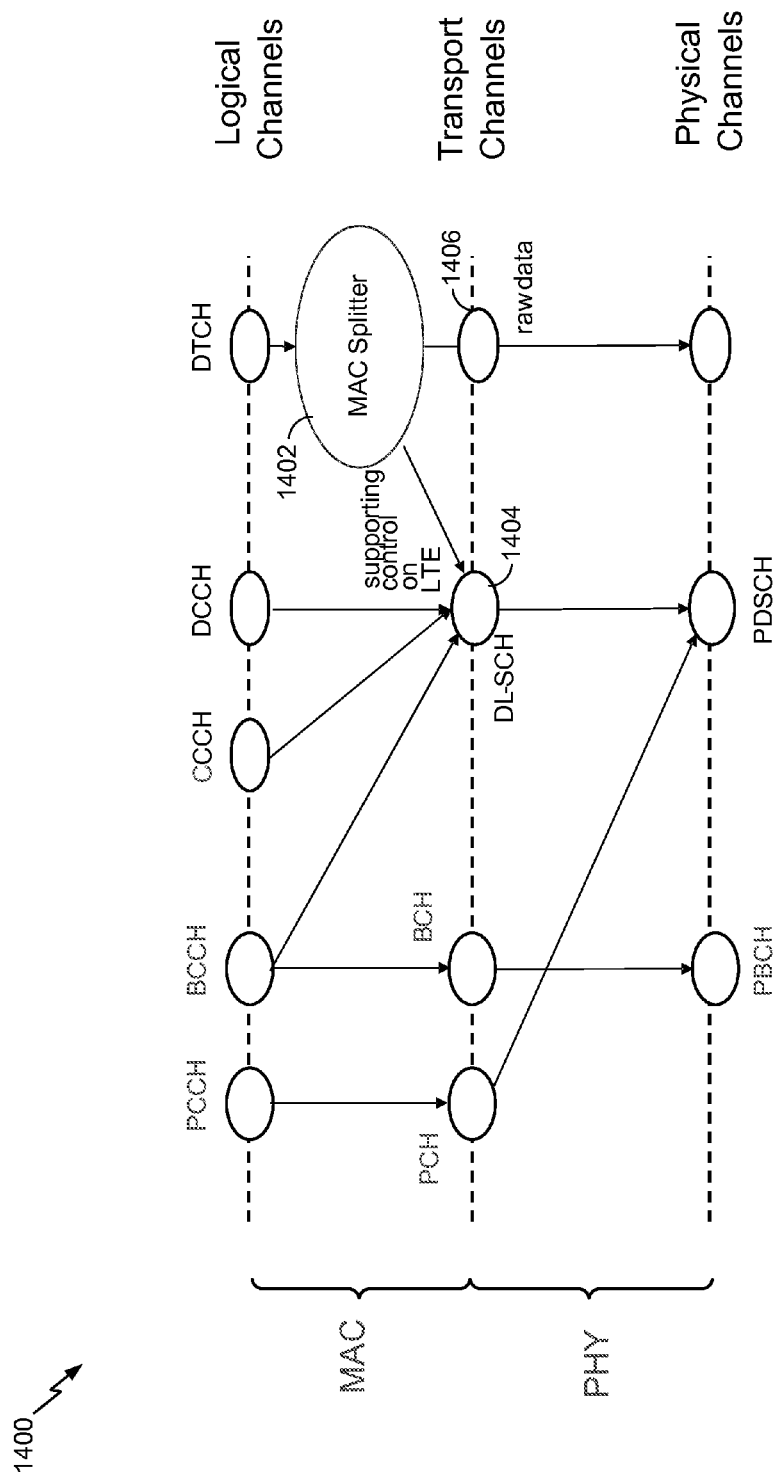
FIG. 14 illustrates a block diagram of an example channel configuration for employing a first RAT and an assisting RAT to perform wireless communications.

FIG. 14 illustrates example logical, transport, and physical channels 1400 over MAC and PHY layers in accordance with aspects described herein such to provide a common MAC layer that communicates over a first RAT PHY layer (e.g., Wi-Fi) and an assisting RAT PHY layer (e.g., LTE). The channels 1400 include various standard LTE channels (e.g., paging control channel (PCCH), broadcast control channel (BCCH), pilot channel (PCH), broadcast channel (BCH), physical broadcast channel (PBCH), common control channel (CCCH), dedicated control channel (DCCH), downlink shared channel (DL-SCH), physical downlink shared channel (PDSCH), etc., and a dedicated traffic channel (DTCH), over which Wi-Fi data can be transmitted. Accordingly, for example, the DTCH traffic can be formatted in a Wi-Fi like packet data unit (PDU) at the MAC layer (or a higher layer, such as RLC, which is received by the MAC layer for communicating over the PHY layer). The Wi-Fi like PDU is then provided to a MAC splitter 1402. The MAC splitter 1402, which may implement various component described herein (e.g., first RAT synchronizing component 210/230, preamble transmitting component 212, transmission scheduling component 214, HARQ component 216/236, preamble receiving component 232, grant receiving component 234, channel sounding component 238, etc.) facilitates use of the physical LTE and physical Wi-Fi connections. For example, the MAC splitter 1402 can split raw data 1406 for communicating over the physical Wi-Fi connection from at least some supporting control data 1404 (e.g., Wi-Fi preamble, HARQ feedback for the Wi-Fi data, channel sounding information, modulation, coding, number of spatial streams, etc.) for transmitting over the physical LTE connection, as described herein. Thus, at least the control data can benefit from physical layer properties of the LTE connection (e.g., HARQ, CRC, etc.) to provide improved reliability, range, etc., in communicating the control data. It is to be appreciated, in this regard, that data received over the physical Wi-Fi connection may not be decodable without corresponding control information received over the physical LTE connection.

Figure 15:
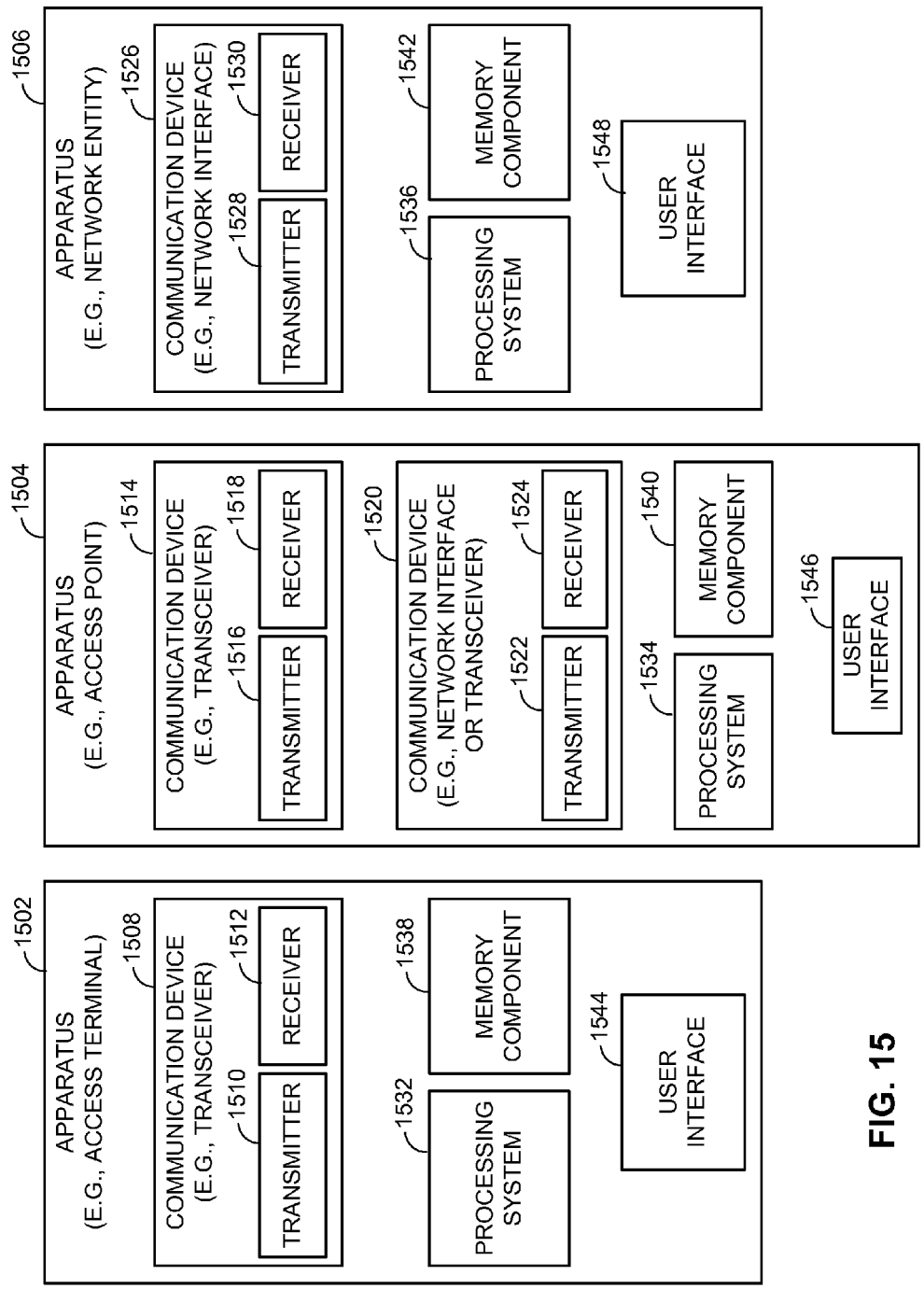
FIG. 15 is a simplified block diagram of several sample aspects of components that may be employed in communication nodes.

FIG. 15 illustrates several sample components (represented by corresponding blocks) that may be incorporated into an apparatus 1502, an apparatus 1504, and an apparatus 1506 (e.g., corresponding to an access terminal, an access point, and a network entity, respectively, such as the ones described above with respect to FIG. 1) to support communication adaptation operations as taught herein. It should be appreciated that these components may be implemented in different types of apparatuses in different implementations (e.g., in an ASIC, in a system-on-chip (SoC), etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies. In an example, apparatus 1502 can include an access terminal 102, apparatus 1504 can include an access point 106, apparatus 1506 can include network entities 108, etc.

Thus, for example, apparatus 1502 can include components described with respect to an access terminal 102, such as a first RAT radio 110, assisting RAT radio 114, first RAT synchronizing component 230, preamble receiving component 232, grant receiving component 234, HARQ component 236, channel sounding component 238, etc. In one example, processing system 1532, communication device 1508, etc. may implement or otherwise operate with such components, memory component 1538 may include instructions and/or parameters for performing functions of such components (e.g., as described in methods 300, 500, 700, 1000, 1200, etc.), and/or the like. Moreover, for example, apparatus 1504 can include components described with respect to an access point 106, such as a first RAT radio 112, assisting RAT radio 116, first RAT synchronizing component 210, preamble transmitting component 212, transmission scheduling component 214, HARQ component 216, NDP transmitting component 218, access point collaborating component 220, etc. In one example, processing system 1534, communication device 1514, etc. may implement or otherwise operate with such components, memory component 1540 may include instructions and/or parameters for performing functions of such components (e.g., as described in methods 300, 500, 700, 1000, 1200, etc.), and/or the like.

The apparatus 1502 and the apparatus 1504 each include at least one wireless communication device (represented by the communication devices 1508 and 1514 (and the communication device 1520 if the apparatus 1504 is a relay)) for communicating with other nodes via at least one designated radio access technology. Each communication device 1508 includes at least one transmitter (represented by the transmitter 1510) for transmitting and encoding signals (e.g., messages, indications, information, and so on) and at least one receiver (represented by the receiver 1512) for receiving and decoding signals (e.g., messages, indications, information, pilots, and so on). Similarly, each communication device 1514 includes at least one transmitter (represented by the transmitter 1516) for transmitting signals (e.g., messages, indications, information, pilots, and so on) and at least one receiver (represented by the receiver 1518) for receiving signals (e.g., messages, indications, information, and so on). If the apparatus 1504 is a relay access point, each communication device 1520 may include at least one transmitter (represented by the transmitter 1522) for transmitting signals (e.g., messages, indications, information, pilots, and so on) and at least one receiver (represented by the receiver 1524) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 1504 comprises a network listen module.

The apparatus 1506 (and the apparatus 1504 if it is not a relay access point) includes at least one communication device (represented by the communication device 1526 and, optionally, 1520) for communicating with other nodes. For example, the communication device 1526 may comprise a network interface that is configured to communicate with one or more network entities via a wire-based or wireless backhaul. In some aspects, the communication device 1526 may be implemented as a transceiver configured to support wire-based or wireless signal communication. This communication may involve, for example, sending and receiving: messages, parameters, or other types of information. Accordingly, in the example of FIG. 15, the communication device 1526 is shown as comprising a transmitter 1528 and a receiver 1530. Similarly, if the apparatus 1504 is not a relay access point, the communication device 1520 may comprise a network interface that is configured to communicate with one or more network entities via a wire-based or wireless backhaul. As with the communication device 1526, the communication device 1520 is shown as comprising a transmitter 1522 and a receiver 1524.

The apparatuses 1502, 1504, and 1506 also include other components that may be used in conjunction with utilizing assisting RATs as described herein. The apparatus 1502 includes a processing system 1532 for providing functionality relating to, for example, communicating with an access point to support communication adaptation as taught herein and for providing other processing functionality. The apparatus 1504 includes a processing system 1534 for providing functionality relating to, for example, communication adaptation as taught herein and for providing other processing functionality. The apparatus 1506 includes a processing system 1536 for providing functionality relating to, for example, communication adaptation as taught herein and for providing other processing functionality. The apparatuses 1502, 1504, and 1506 include memory devices 1538, 1540, and 1542 (e.g., each including a memory device), respectively, for maintaining information (e.g., information indicative of reserved resources, thresholds, parameters, and so on). In addition, the apparatuses 1502, 1504, and 1506 include user interface devices 1544, 1546, and 1548, respectively, for providing indications (e.g., audible and/or visual indications) to a user and/or for receiving user input (e.g., upon user actuation of a sensing device such a keypad, a touch screen, a microphone, and so on).

For convenience, the apparatus 1502 is shown in FIG. 15 as including components that may be used in the various examples described herein. In practice, the illustrated blocks may have different functionality in different aspects.

The components of FIG. 15 may be implemented in various ways. In some implementations, the components of FIG. 15 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 1508, 1532, 1538, and 1544 may be implemented by processor and memory component(s) of the apparatus 1502 (e.g., by execution of appropriate code and/or by appropriate configuration of processor components). Similarly, some or all of the functionality represented by blocks 1514, 1520, 1534, 1540, and 1546 may be implemented by processor and memory component(s) of the apparatus 1504 (e.g., by execution of appropriate code and/or by appropriate configuration of processor components). Also, some or all of the functionality represented by blocks 1526, 1536, 1542, and 1548 may be implemented by processor and memory component(s) of the apparatus 1506 (e.g., by execution of appropriate code and/or by appropriate configuration of processor components).

Some of the access points referred to herein may comprise small cells. In some networks, small cells are deployed to supplement conventional network access points (e.g., macro access points). For example, a small cell installed in a user's home or in an enterprise environment (e.g., commercial buildings) may provide voice and high speed data service for access terminals supporting cellular radio communication (e.g., CDMA, WCDMA, UMTS, LTE, etc.). In general, these small cells can provide more robust coverage and higher throughput for access terminals in the vicinity of the low-power access points.

As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a BS, an access point, a femto node, a femtocell, a pico node, a micro node, a Node B, eNB, home Node B (HNB) or home evolved Node B (HeNB). Therefore, the term "small cell," as used herein, refers to a relatively low transmit power and/or a relatively small coverage area cell as compared to a macro cell.

Small cells may be configured to support different types of access modes. For example, in an open access mode, a small cell may allow any access terminal to obtain any type of service via the small cell. In a restricted (or closed) access mode, a small cell may only allow authorized access terminals to obtain service via the small cell. For example, a small cell may only allow access terminals (e.g., so called home access terminals) belonging to a certain subscriber group (e.g., a closed subscriber group (CSG)) to obtain service via the small cell. In a hybrid access mode, alien access terminals (e.g., non-home access terminals, non-CSG access terminals) may be given limited access to the small cell. For example, a macro access terminal that does not belong to a small cell's CSG may be allowed to access the small cell only if sufficient resources are available for all home access terminals currently being served by the small cell.

Thus, small cells operating in one or more of these access modes may be used to provide indoor coverage and/or extended outdoor coverage. By allowing access to users through adoption of a desired access mode of operation, small cells may provide improved service within the coverage area and potentially extend the service coverage area for users of a macro network.

Thus, in some aspects the teachings herein may be employed in a network that includes macro scale coverage (e.g., a large area cellular network such as a third generation (3G) network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a small cell. It should be appreciated that the teachings herein may be applicable to nodes associated with other types of coverage areas. For example, a pico access point may provide coverage (e.g., coverage within a commercial building) over an area that is smaller than a macro area and larger than a femto cell area. In various applications, other terminology may be used to reference a macro access point, a small cell, or other access point-type nodes. For example, a macro access point may be configured or referred to as an access node, base station, access point, eNodeB, macro cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 16:
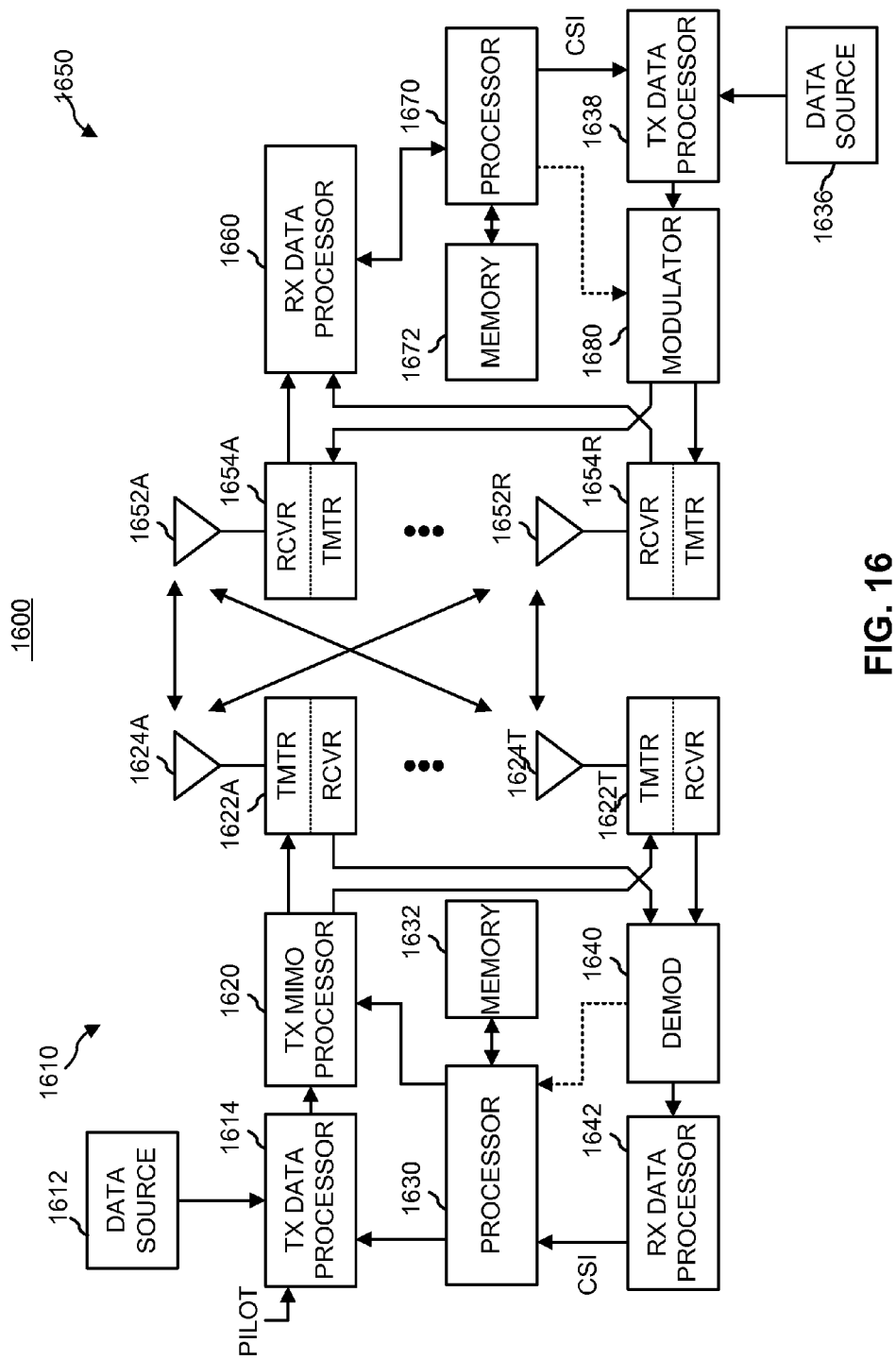
FIG. 16 is a simplified block diagram of several sample aspects of communication components.

FIG. 16 illustrates in more detail the components of a wireless device 1610 (e.g., an access point) and a wireless device 1650 (e.g., an access terminal) of a sample communication system 1600 that may be adapted as described herein. In an example, wireless device 1610 can include an access point 106, and may thus include components thereof described with respect to FIGS. 1 and 2 for performing functions described in FIGS. 3, 5, 7, 10, and 12, etc. (e.g., a first RAT radio 112, an assisting RAT radio 116, a first RAT synchronizing component 210, a preamble transmitting component 212, a transmission scheduling component 214, a HARQ component 216, a NDP transmitting component 218, an access point collaborating component 220, etc.). Wireless device 1650 can include an access terminal 102, and may thus include components thereof described with respect to FIGS. 1 and 2 for performing functions described in FIGS. 3, 5, 7, 10, and 12, etc. (e.g., a first RAT radio 110, an assisting RAT radio 114, a first RAT synchronizing component 230, a preamble receiving component 232, a grant receiving component 234, a HARQ component 236, a channel sounding component 238, etc.). At the device 1610, traffic data for a number of data streams is provided from a data source 1612 to a transmit (TX) data processor 1614. Each data stream may then be transmitted over a respective transmit antenna.

The TX data processor 1614 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1630. A data memory 1632 may store program code, data, and other information used by the processor 1630 or other components of the device 1610.

The modulation symbols for all data streams are then provided to a TX MIMO processor 1620, which may further process the modulation symbols (e.g., for OFDM). The TX MIMO processor 1620 then provides NT modulation symbol streams to NT transceivers (XCVR) 1622A through 1622T. In some aspects, the TX MIMO processor 1620 applies beam-forming weights to the symbols of the data streams and to the antenna from which the symbol is being transmitted.

Each transceiver 1622 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1622A through 1622T are then transmitted from NT antennas 1624A through 1624T, respectively.

At the device 1650, the transmitted modulated signals are received by NR antennas 1652A through 1652R and the received signal from each antenna 1652 is provided to a respective transceiver (XCVR) 1654A through 1654R. Each transceiver 1654 conditions (e.g., filters, amplifies, and downconverts) a respective received signal, digitizes the conditioned signal to provide samples, and further processes the samples to provide a corresponding "received" symbol stream.

A receive (RX) data processor 1660 then receives and processes the NR received symbol streams from NR transceivers 1654 based on a particular receiver processing technique to provide NT "detected" symbol streams. The RX data processor 1660 then demodulates, deinterleaves, and decodes each detected symbol stream to recover the traffic data for the data stream. The processing by the RX data processor 1660 is complementary to that performed by the TX MIMO processor 1620 and the TX data processor 1614 at the device 1610.

A processor 1670 periodically determines which precoding matrix to use (discussed below). The processor 1670 formulates a reverse link message comprising a matrix index portion and a rank value portion. A data memory 1672 may store program code, data, and other information used by the processor 1670 or other components of the device 1650.

The reverse link message may comprise various types of information regarding the communication link and/or the received data stream. The reverse link message is then processed by a TX data processor 1638, which also receives traffic data for a number of data streams from a data source 1636, modulated by a modulator 1680, conditioned by the transceivers 1654A through 1654R, and transmitted back to the device 1610.

At the device 1610, the modulated signals from the device 1650 are received by the antennas 1624, conditioned by the transceivers 1622, demodulated by a demodulator (DEMOD) 1640, and processed by a RX data processor 1642 to extract the reverse link message transmitted by the device 1650. The processor 1630 then determines which pre-coding matrix to use for determining the beam-forming weights then processes the extracted message.

It will be appreciated that for each device 1610 and 1650 the functionality of two or more of the described components may be provided by a single component. It will be also be appreciated that the various communication components illustrated in FIG. 16 and described above may be further configured as appropriate to perform communication adaptation as taught herein. For example, the processors 1630/1670 may cooperate with the memories 1632/1672 and/or other components of the respective devices 1610/1650 to perform the communication adaptation as taught herein.

Figure 17:
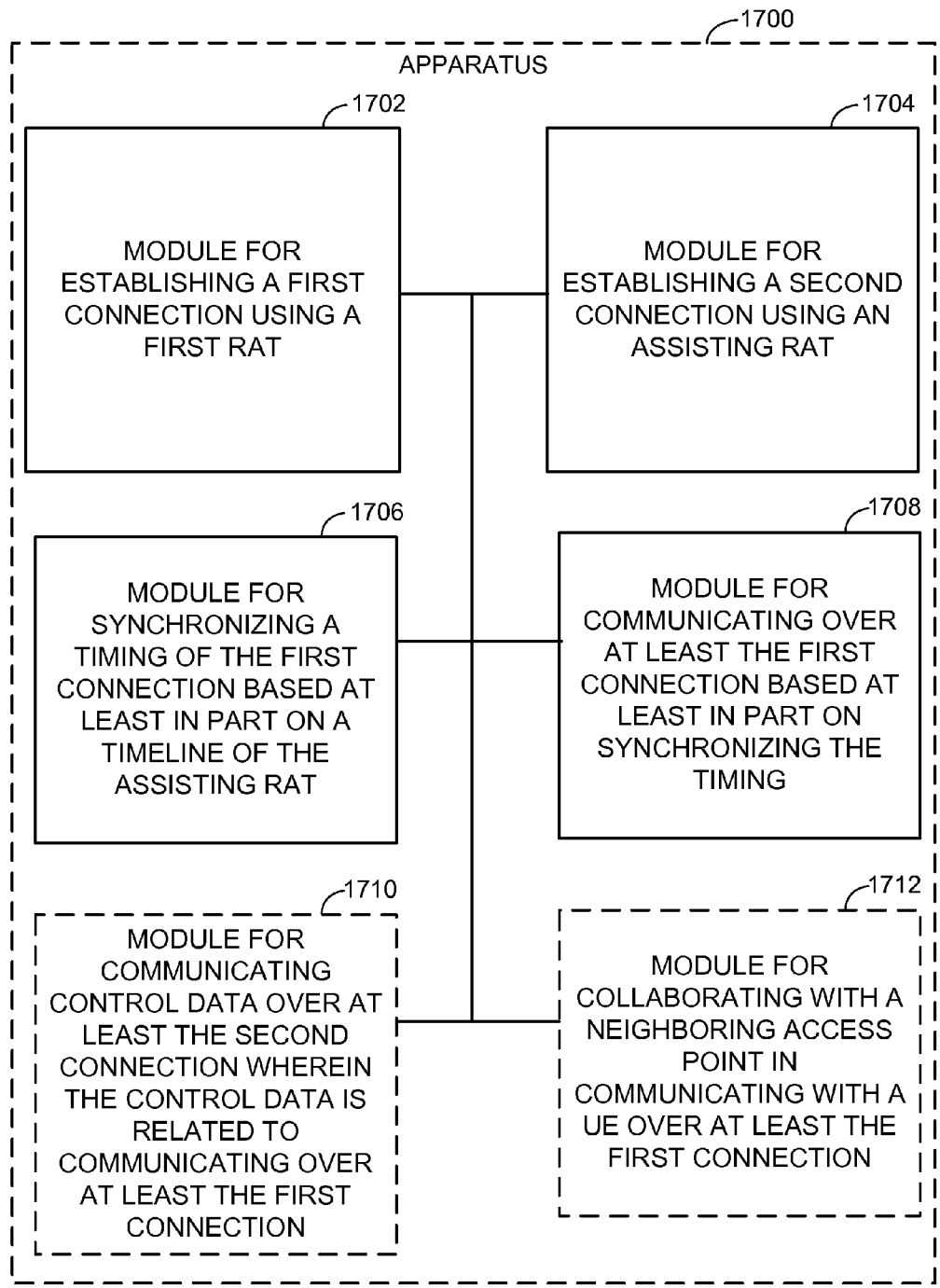
FIG. 17 is a simplified block diagram of several sample aspects of apparatuses configured to support communication as taught herein.

FIG. 17 illustrates an example apparatus 1700, which can include an access point apparatus, access terminal apparatus, etc., represented as a series of interrelated functional modules. A module for establishing a first connection using a first RAT 1702 may correspond at least in some aspects to, for example, a processing system, as discussed herein. A module for establishing a second connection using an assisting RAT 1704 may correspond at least in some aspects to, for example, a processing system as discussed herein. A module for synchronizing a timing of the first connection based at least in part on a timeline of the assisting RAT 1706 may correspond at least in some aspects to, for example, a processing system or communication device in conjunction with a communication device as discussed herein. A module for communicating over at least the first connection based at least in part on synchronizing the timing 1708 may correspond at least in some aspects to, for example, a processing system or communication device in conjunction with a communication device as discussed herein. Optionally, a module for communicating control data over at least the second connection wherein the control data is related to communicating over at least the first connection 1710 may correspond at least in some aspects to, for example, a processing system or communication devices in conjunction with a communication device as discussed herein. Moreover, optionally, a module for collaborating with a neighboring access point in communicating with a UE over at least the first connection 1712 may correspond at least in some aspects to, for example, a processing system or communication devices in conjunction with a communication device as discussed herein The functionality of the modules 1702, 1704, 1706, 1708 (and optionally modules 1710, 1712) of FIG. 17 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module.

In addition, the components and functions represented by FIG. 17 as well as other components and functions described herein, may be implemented using any suitable means. Such means also may be implemented, at least in part, using corresponding structure as taught herein. For example, the components described above in conjunction with the "module for" components of FIG. 17 also may correspond to similarly designated "means for" functionality. Thus, in some aspects one or more of such means may be implemented using one or more of processor components, integrated circuits, or other suitable structure as taught herein.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for performing carrier sense adaptive transmission. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for communicating in a wireless network using a first radio access technology (RAT) and an assisting RAT, comprising:
    establishing, via a first RAT radio of an access point, a first connection with a user equipment (UE) using the first RAT;
    establishing, via an assisting RAT radio of the access point, a second connection with the UE using the assisting RAT;
    synchronizing a timing of the first connection based at least in part on a timeline of the assisting RAT; and
    collaborating, by the access point, with a neighboring access point in communicating, via the first RAT radio of the access point, with a UE over at least the first connection.

2. The method of claim 1, wherein collaborating with the neighboring access point comprises:
    determining a beamforming matrix related to communications over a connection at the neighboring access point, wherein the connection utilizes the first RAT synchronized based on the timeline of the assisting RAT; and
    performing collaborative beamforming with the neighboring access point via the first RAT radio of the access point in communicating with the UE over the first connection based at least in part on the beamforming matrix.

3. The method of claim 2, wherein determining the beamforming matrix comprises determining the beamforming matrix based at least in part on a first V-matrix received in a first signal from the UE and a second V-matrix received from the neighboring access point, wherein the second V-matrix is received by the neighboring access point in a second signal from the UE.

4. The method of claim 2, wherein determining the beamforming matrix comprises receiving, via the first RAT radio and from the neighboring access point, the beamforming matrix.

5. The method of claim 1, wherein collaborating with the neighboring access point comprises transmitting, via the first RAT radio and to the neighboring access point, a V-matrix from the UE.

6. The method of claim 1, further comprising determining first in-phase (I)/quadrature phase (Q) samples of a first signal received from the UE, wherein collaborating with the neighboring access point comprises:
    receiving, via the first RAT radio and from the neighboring access point, second I/Q samples of a second signal of the UE; and detecting a packet from the UE based at least in part on the first I/Q samples and the second I/Q samples.

7. The method of claim 1, wherein the first RAT is a wireless local area network (WLAN) RAT and the assisting RAT is a cellular technology RAT.

8. An apparatus for communicating in a wireless network using a first radio access technology (RAT) and an assisting RAT, comprising:
   a first RAT radio configured to establish a first connection with a user equipment (UE) using the first RAT;
   an assisting RAT radio configured to establish a second connection with the UE using the assisting RAT;
   a memory component; and
   at least one processor coupled to the memory component, the at least one processor and the memory component configured to:
      synchronize a timing of the first connection based at least in part on a timeline of the assisting RAT; and
      collaborate with a neighboring access point in communicating, via the first RAT radio, with a UE over at least the first connection.

9. The apparatus of claim 8, wherein the at least one processor and the memory component are further configured to:
   determine a beamforming matrix related to communications over a connection at the neighboring access point, wherein the connection utilizes the first RAT synchronized based on the timeline of the assisting RAT; and
   perform collaborative beamforming with the neighboring access point via the first RAT radio in communicating with the UE over the first connection based at least in part on the beamforming matrix.

10. The apparatus of claim 9, wherein the at least one processor and the memory component are configured to determine the beamforming matrix based at least in part on a first V-matrix received in a first signal from the UE and a second V-matrix received from the neighboring access point, wherein the second V-matrix is received by the neighboring access point in a second signal from the UE.

11. The apparatus of claim 9, wherein the at least one processor and the memory component are configured to determine the beamforming matrix at least in part by receiving, via the first RAT radio and from the neighboring access point, the beamforming matrix.

12. The apparatus of claim 8, wherein the at least one processor and the memory component are configured to transmit, via the first RAT radio and to the neighboring access point, a V-matrix from the UE.

13. The apparatus of claim 8, wherein the at least one processor and the memory component are further configured to determine first in-phase (I)/quadrature phase (Q) samples of a first signal received from the UE, and wherein the at least one processor and the memory component are configured to collaborate with the neighboring access point at least in part by:
   receiving, via the first RAT radio and from the neighboring access point, second I/Q samples of a second signal of the UE; and
   detecting a packet from the UE based at least in part on the first I/Q samples and the second I/Q samples.

14. The apparatus of claim 8, wherein the first RAT is a wireless local area network (WLAN) RAT and the assisting RAT is a cellular technology RAT.

15. A non-transitory computer-readable storage medium comprising computer-executable code for communicating in a wireless network using a first radio access technology (RAT) and an assisting RAT, the code comprising:
   code for establishing, via a first RAT radio of an access point, a first connection with a user equipment (UE) using the first RAT;
   code for establishing, via an assisting RAT radio of the access point, a second connection with the UE using the assisting RAT;
   code for synchronizing a timing of the first connection based at least in part on a timeline of the assisting RAT; and
   code for collaborating, by the access point, with a neighboring access point in communicating, via the first RAT radio of the access point, with a UE over at least the first connection.

16. The non-transitory computer-readable storage medium of claim 15, wherein the code for collaborating with the neighboring access point comprises:
   code for determining a beamforming matrix related to communications over a connection at the neighboring access point, wherein the connection utilizes the first RAT synchronized based on the timeline of the assisting RAT; and
   code for performing collaborative beamforming with the neighboring access point via the first RAT radio of the access point in communicating with the UE over the first connection based at least in part on the beamforming matrix.

17. The non-transitory computer-readable storage medium of claim 16, wherein the code for determining the beamforming matrix determines the beamforming matrix based at least in part on a first V-matrix received in a first signal from the UE and a second V-matrix received from the neighboring access point, wherein the second V-matrix is received by the neighboring access point in a second signal from the UE.

18. The non-transitory computer-readable storage medium of claim 16, wherein the code for determining the beamforming matrix comprises receives, via the first RAT radio and from the neighboring access point, the beamforming matrix.

19. The non-transitory computer-readable storage medium of claim 15, wherein the code for collaborating with the neighboring access point transmits, via the first RAT radio and to the neighboring access point, a V-matrix from the UE.

20. The non-transitory computer-readable storage medium of claim 15, wherein the code further comprises code for determining first in-phase (I)/quadrature phase (Q) samples of a first signal received from the UE, and wherein the code for collaborating with the neighboring access point comprises:
   code for receiving, via the first RAT radio and from the neighboring access point, second I/Q samples of a second signal of the UE; and
   code for detecting a packet from the UE based at least in part on the first I/Q samples and the second I/Q samples.

* * * * *